Figure 1:
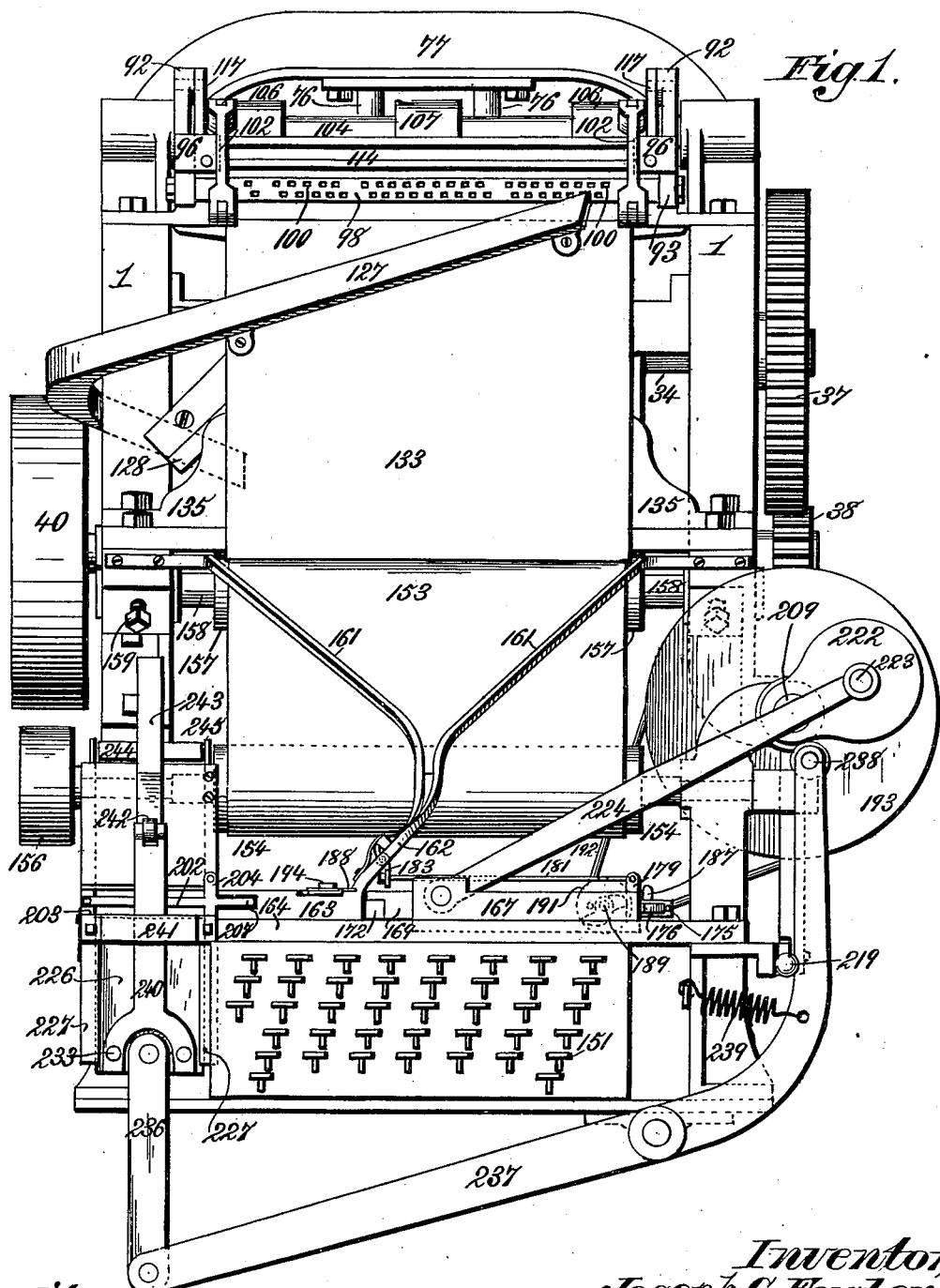

No. 667,212. Patented Feb. 5, 1901.
JOSEPH C. FOWLER & JOSEPH C. FOWLER, Jr.
TYPE CASTING, COMPOSING, AND JUSTIFYING MACHINE.
(Application filed Aug. 18, 1900.)
(No Model.) 9 Sheets—Sheet 1.

Witnesses.
Robert Everett.

Inventors.
Joseph C. Fowler.
Joseph C. Fowler Jr.
By James L. Norris.
Atty.

THE NORRIS PETERS CO., PHOTO-LITHO., WASHINGTON, D. C.

No. 667,212. Patented Feb. 5, 1901.
J. C. FOWLER & J. C. FOWLER, Jr.
TYPE CASTING, COMPOSING, AND JUSTIFYING MACHINE.
(Application filed Aug. 18, 1900.)
(No Model.) 9 Sheets—Sheet 4.

Witnesses. Inventors
Joseph C. Fowler.
Joseph C. Fowler Jr.
By James L. Norris
Atty.

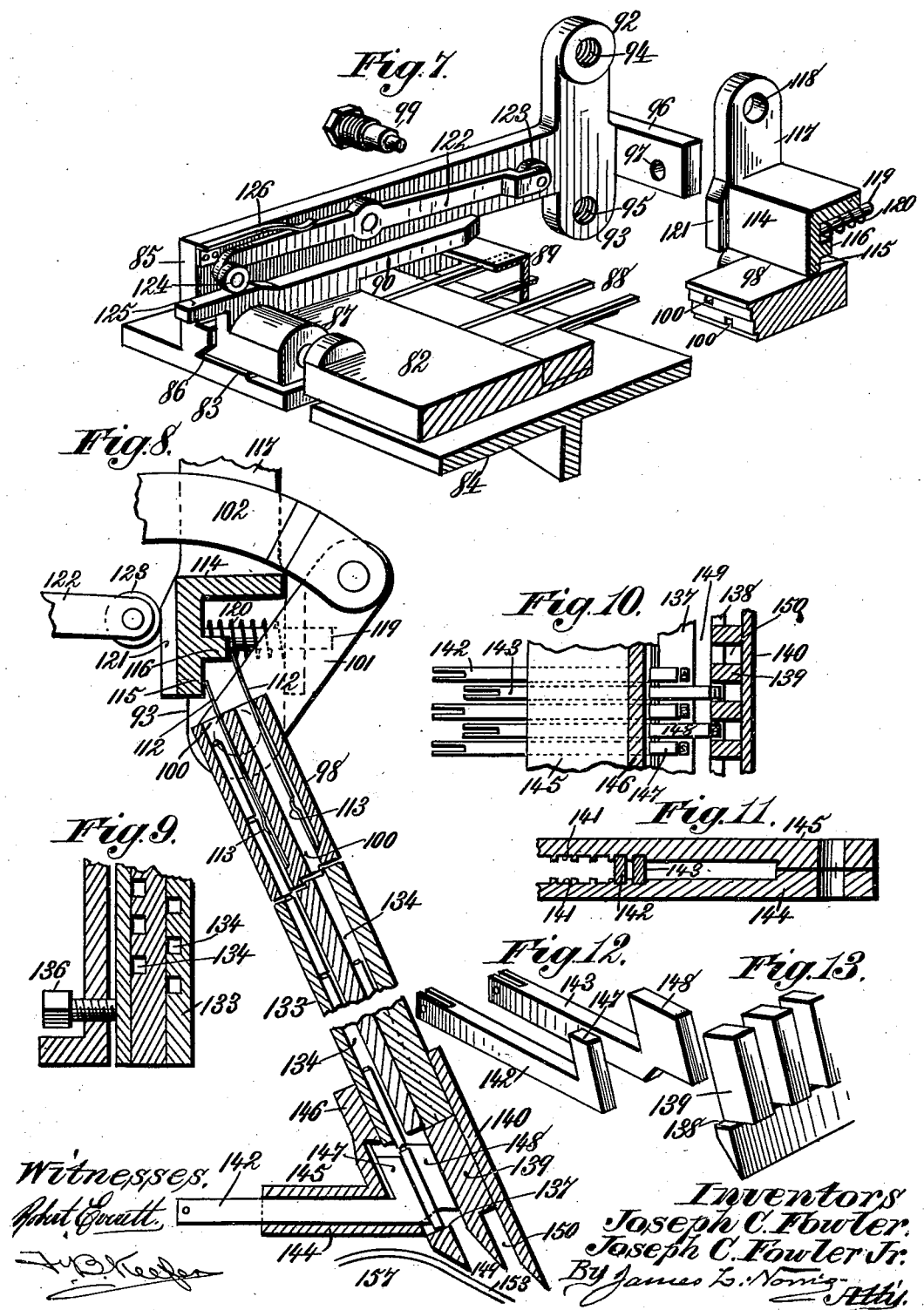

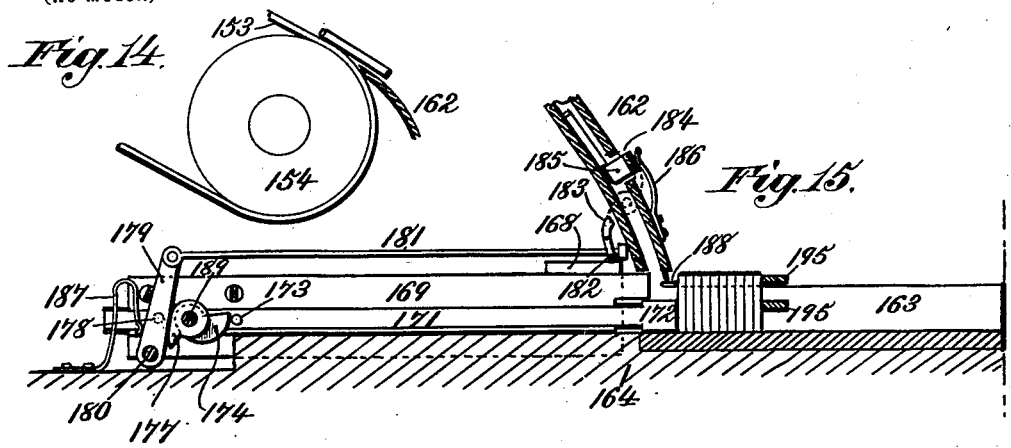
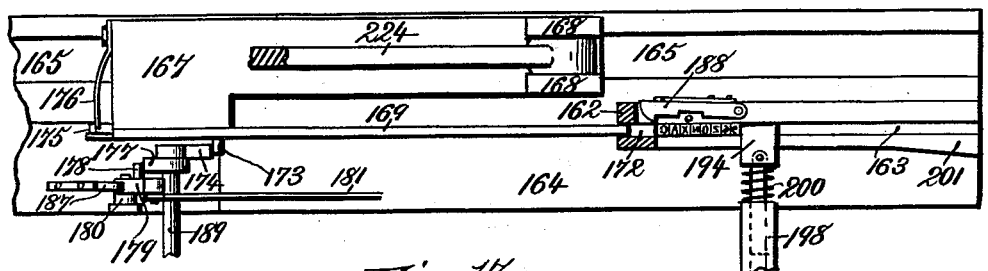
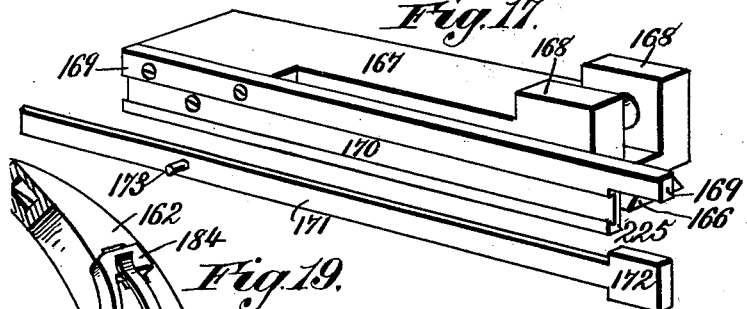
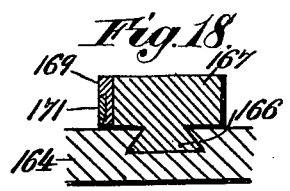
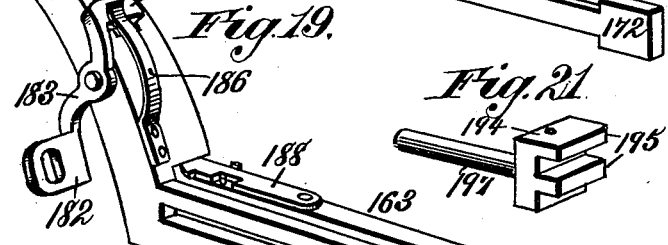
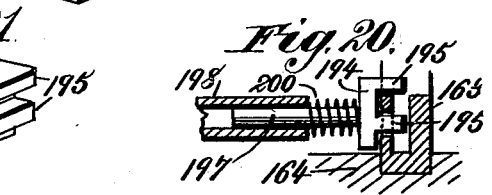

No. 667,212. Patented Feb. 5, 1901.
JOSEPH C. FOWLER & JOSEPH C. FOWLER, Jr.
TYPE CASTING, COMPOSING, AND JUSTIFYING MACHINE.
(Application filed Aug. 18, 1900.)
(No Model.) 9 Sheets—Sheet 7.
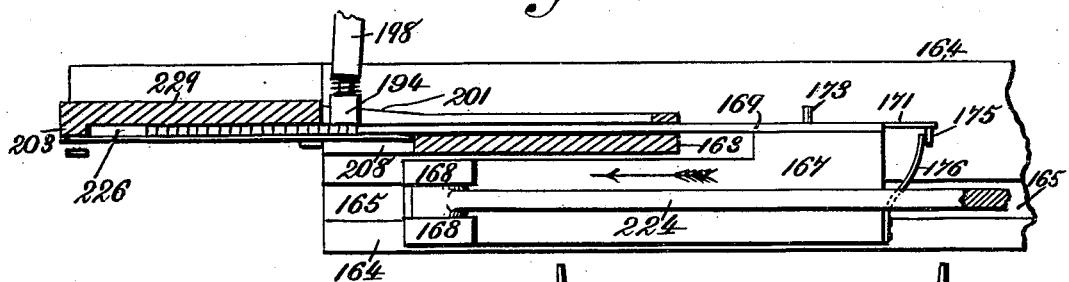
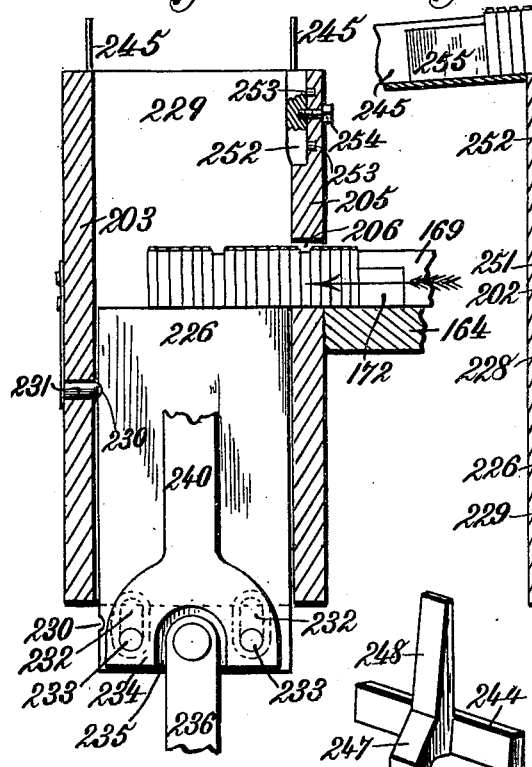
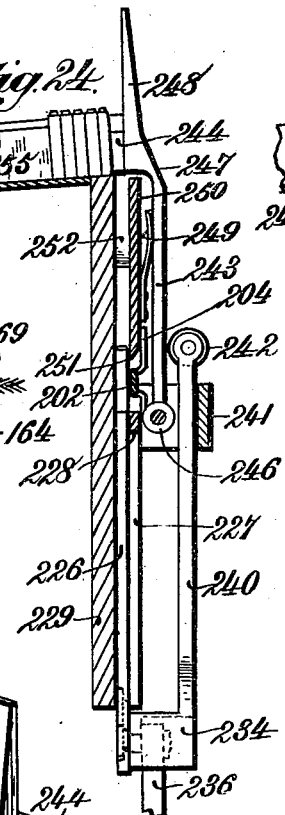
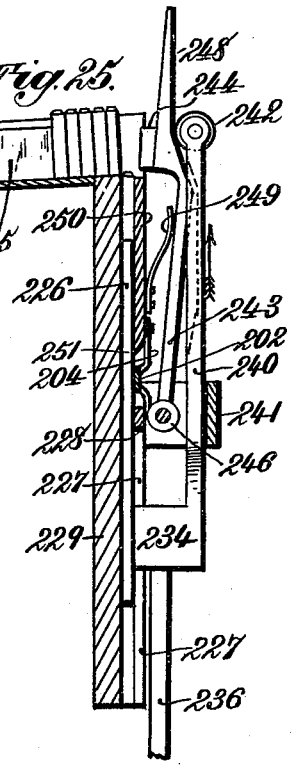
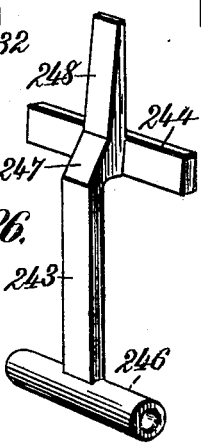
Witnesses.
Robert Everett.
H. B. Keeler.
Inventors.
Joseph C. Fowler.
Joseph C. Fowler Jr.
By James L. Norris.
Atty.

No. 667,212. Patented Feb. 5, 1901.
JOSEPH C. FOWLER & JOSEPH C. FOWLER, Jr.
TYPE CASTING, COMPOSING, AND JUSTIFYING MACHINE.
(Application filed Aug. 18, 1900.)
(No Model.) 9 Sheets—Sheet 8.
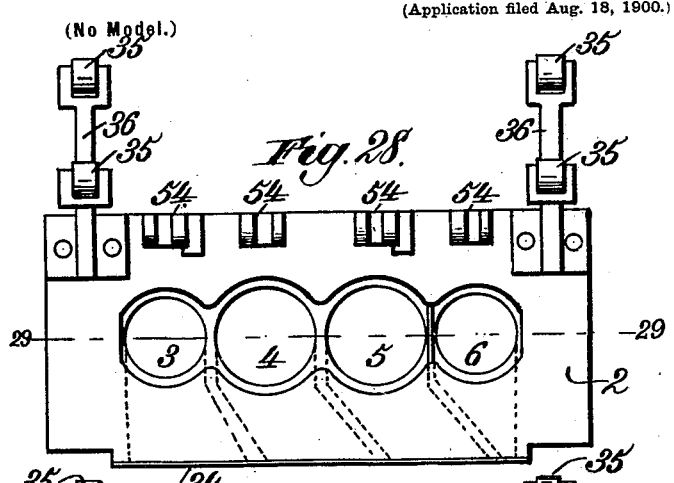
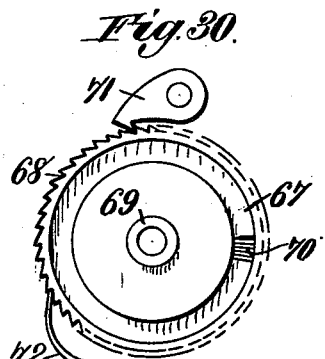
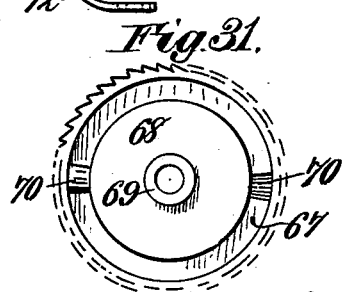
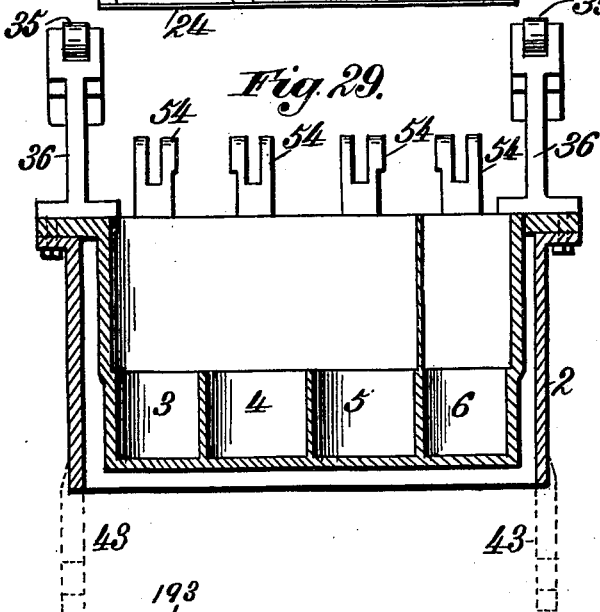
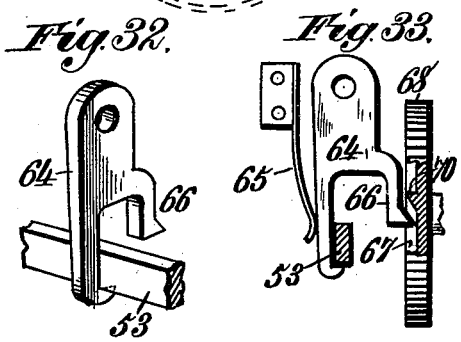
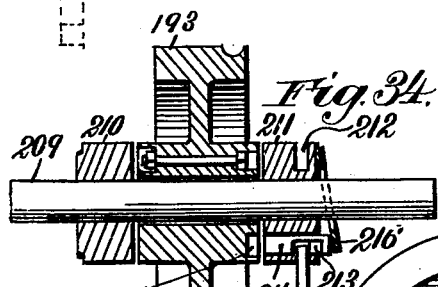
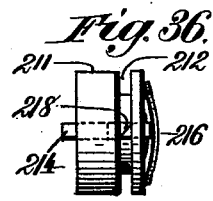
Witnesses
Inventors
Joseph C. Fowler,
Joseph C. Fowler Jr.
By James L. Norris
Atty.

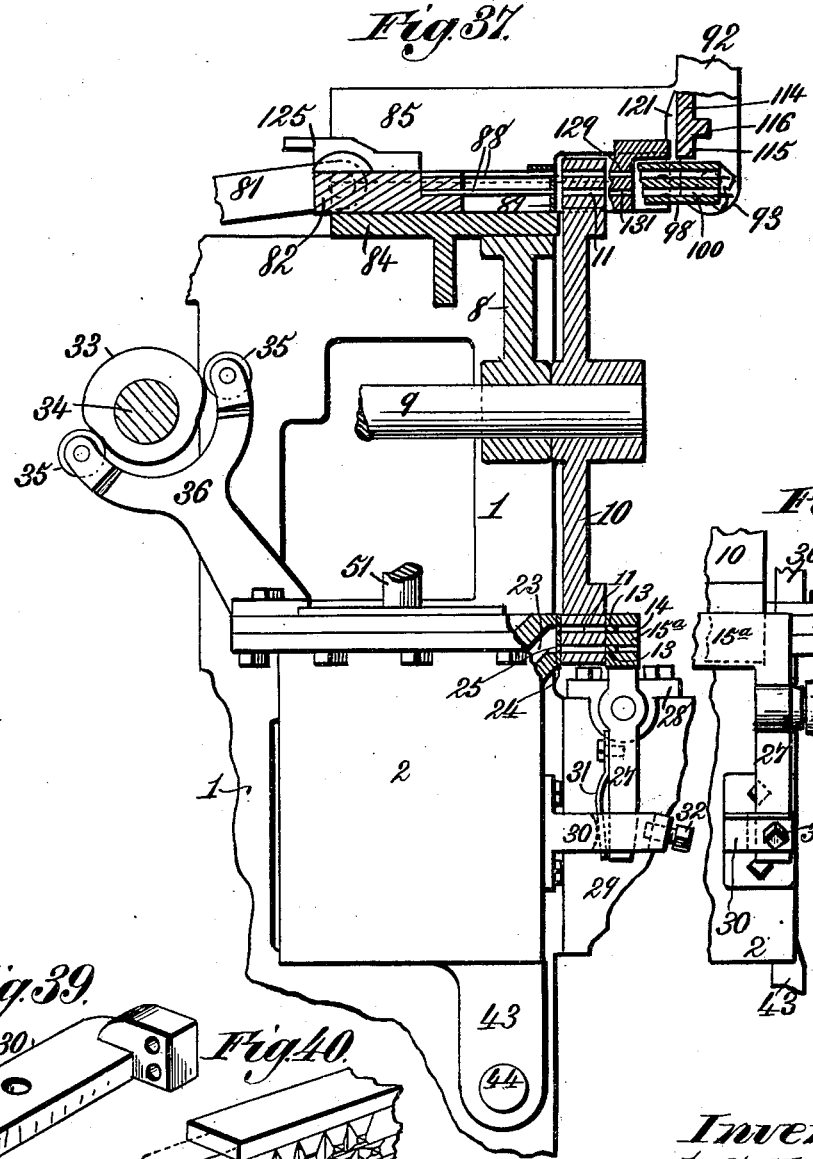

UNITED STATES PATENT OFFICE.

JOSEPH C. FOWLER AND JOSEPH C. FOWLER, JR., OF BALTIMORE, MARYLAND, ASSIGNORS TO THE FOWLER COMPOSING AND TYPE-SETTING COMPANY, OF CHICAGO, ILLINOIS.

TYPE CASTING, COMPOSING, AND JUSTIFYING MACHINE.

SPECIFICATION forming part of Letters Patent No. 667,212, dated February 5, 1901.

Application filed August 18, 1900. Serial No. 27,324. (No model.)

*To all whom it may concern:*

Be it known that we, JOSEPH C. FOWLER and JOSEPH C. FOWLER, Jr., citizens of the United States, residing at Baltimore, in the State of Maryland, have invented new and useful Improvements in Type Casting, Composing, and Justifying Machines, of which the following is a specification.

This invention relates to a type casting, composing, and justifying machine especially adapted to the casting of individual type bearing different printing characters classified in groups approximately according with the varying proportions in which different printing characters, letters, punctuation-marks, and soft compressible spaces are ordinarily required, provision being made for automatically controlling the frequency with which certain groups of type are to be produced, so as to avoid an excessive accumulation of a group or groups of type seldom required, while the individual type and compressible soft-metal spaces are mechanically assembled in line and the successive type-lines uniformly justified to be set in columns or pages suitable for newspaper, book, or other printing.

Among the objects of the present invention are to simplify the construction, arrangement, and operation of type casting, composing, and justifying machines; to greatly increase the capacity of such machines for rapid and accurate production of type-lines composed of individual type and spaces and for the uniform justifying of successively-produced type-lines; to automatically control the casting of different groups of type in differing quantities approximately according with the ordinary demands for different printing characters in the operation of composing or type-setting; to provide for dressing the type as they are ejected from the mold-cavities, thereby imparting a smooth and improved finish; to provide improved mechanism for transferring the cast type from the mold and into a plurality of magazine-cells, in which said type are accumulated in assorted columns to be individually selected and released by improved mechanical means in the operation of composing; to provide improved mechanism for assembling type and spaces in line and pushing the assembled type-line into the justifier, and also to furnish improved means for justifying successively produced and compressible type-lines to a uniform length and collecting them in a column for book, newspaper, and other printing.

For the purpose above stated and to accomplish generally-improved results in the art of type-setting with due regard to accuracy and speed our invention comprises peculiar features of construction and novel combinations of devices in a type casting, composing, and justifying machine, as hereinafter more particularly described and claimed.

Figure 2:
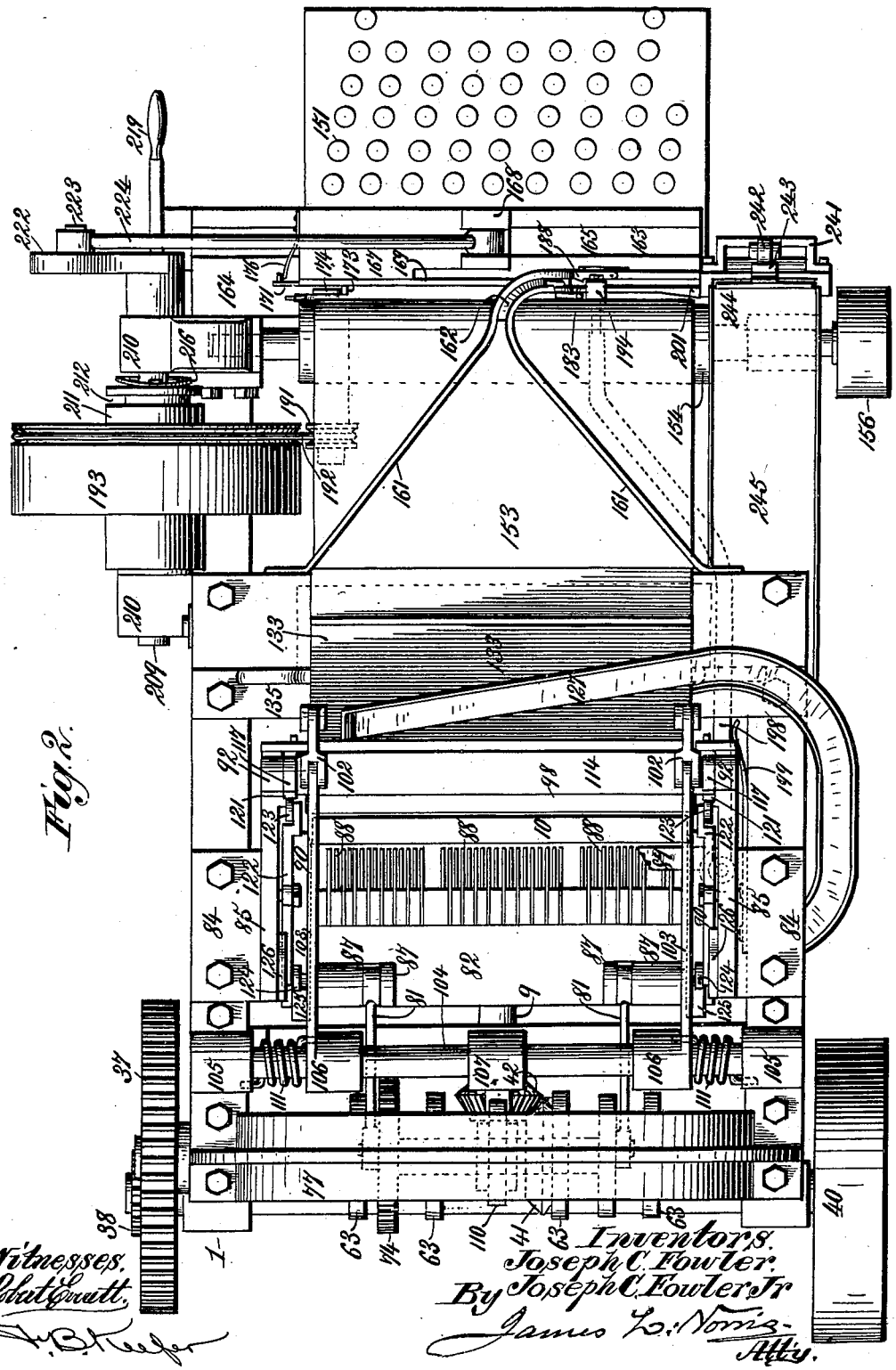
Figure 3:
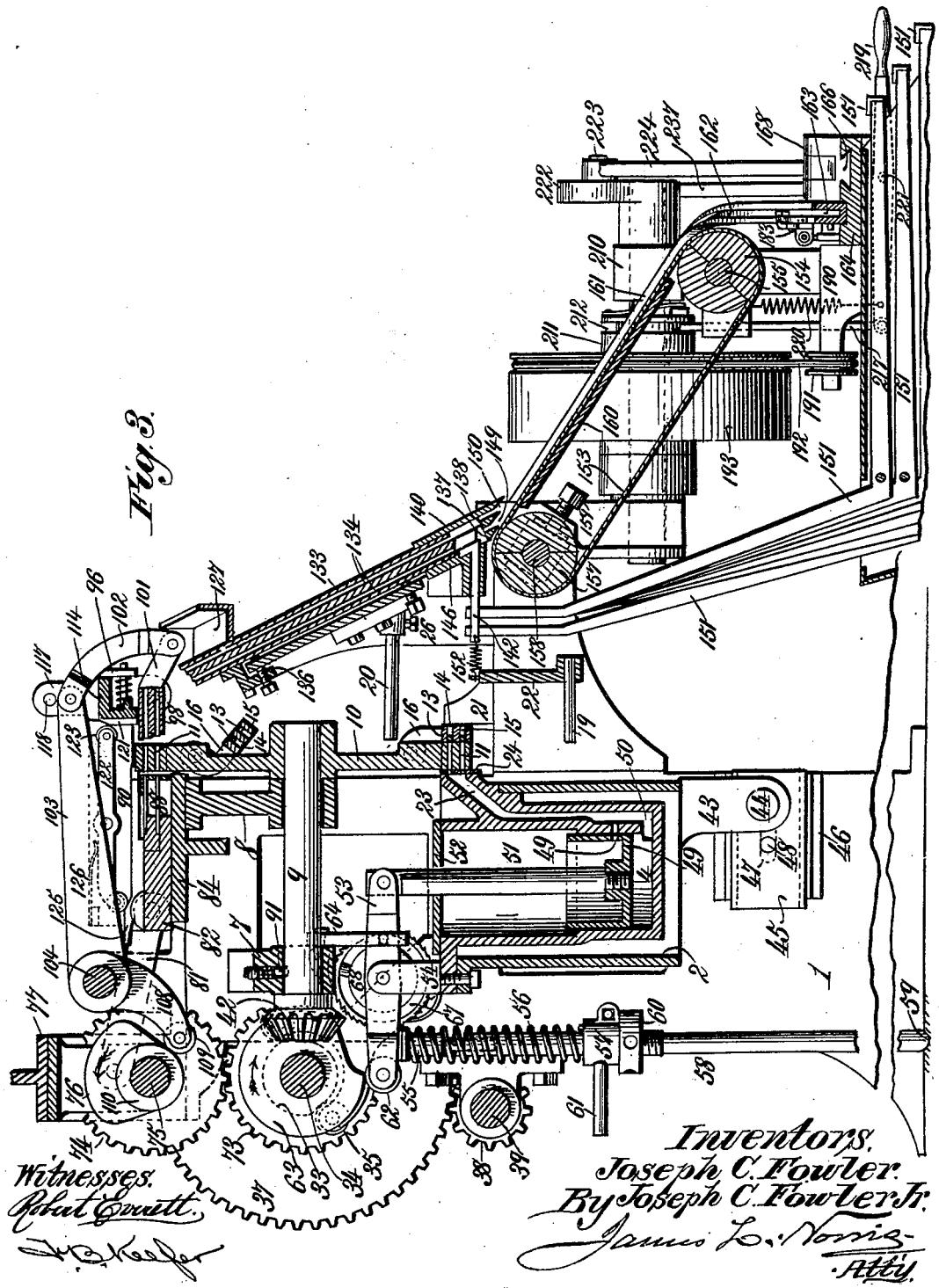
Figure 4:
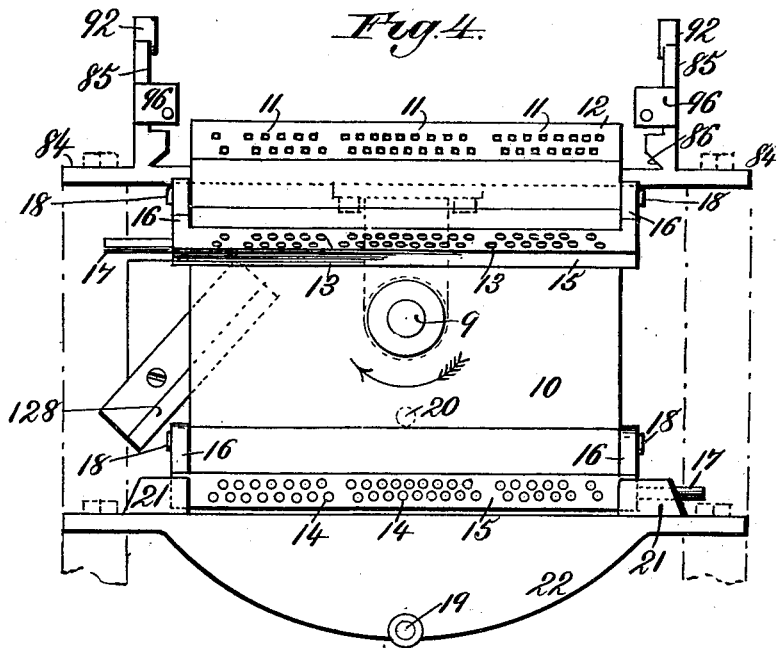
Figure 5:
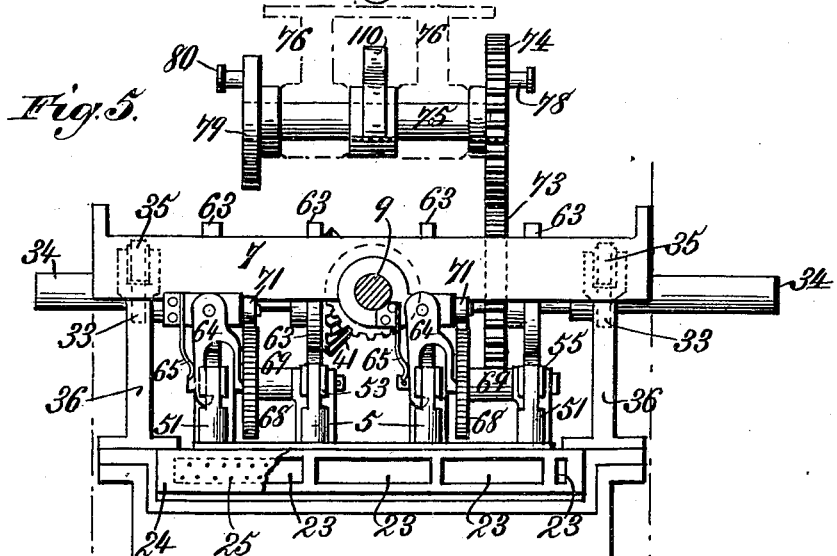
Figure 6:
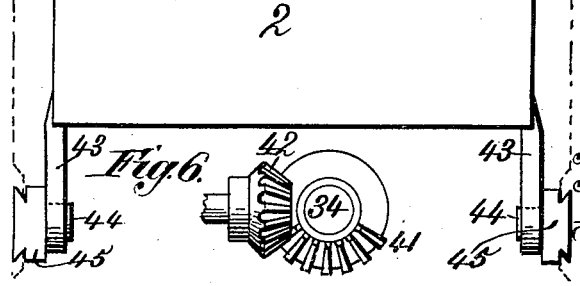

In the annexed drawings, illustrating the invention, Figure 1 is a front elevation of the machine. Fig. 2 is a plan view. Fig. 3 is a vertical central section taken from front to rear of the machine. Fig. 4 is a front elevation of a rotary mold-frame with molds and matrix-carrying bars. Fig. 5 is a view of the casting-pot and accompanying mechanism, looking from the front. Fig. 6 is a view of the mutilated gearing that intermittingly operates the shaft which carries the mold-frame. Fig. 7 is a detail perspective view showing a portion of the sliding head that carries the ejector-fingers and also shows a part of the type reverser and transferrer. Fig. 8 is an enlarged vertical section of a portion of the magazine, including also the type reverser and transferrer. Fig. 9 is an enlarged detail horizontal section of a portion of the magazine. Fig. 10 is a sectional plan view of the lower portion of the magazine, taken slightly above the type-releasing arms or bars. Fig. 11 is a vertical section showing guides for the type-releasing bars. Fig. 12 is a detail perspective view showing the two forms of type-releasing bars or arms. Fig. 13 is a view of a comb-shaped bar at the bottom of the magazine. Fig. 14 is a part sectional view showing the lower portion of the type-carrier apron and its lower roller. Fig. 15 is a sectional elevation showing the means for assembling the type in the assembly-box. Fig. 16 is a plan view of the same. Fig. 17 is a detail perspective view of the type-line pusher and accompanying vibrator. Fig. 18 is a transverse section of the same. Fig. 19 is a detail view of the type-spout and assembling-box. Fig. 20 is a transverse section of the assembling-box, showing also the yielding abutment. Fig. 21 is a detail perspective view of the yielding abutment. Fig. 22 is a part sectional plan showing the type-line pusher in the act of pushing a line of type into the justifying-chamber. Fig. 23 is a vertical section of the justifying-chamber, showing a line of type being pushed into the same and onto the type-line elevator. Fig. 24 is a vertical section of the justifier and elevator mechanism, taken transversely to Fig. 23. Fig. 25 is a similar view showing a justified line of type in course of being elevated to the galley. Fig. 26 is a detail perspective view of an oscillatory arm and its cross-head for pushing a type-line into the galley. Fig. 27 is a detail view of a flat spring or yielding plate for the front of the justifying-chamber. Fig. 28 is a plan of the casting-pot and attachments, showing a plurality of reservoirs for molten metal. Fig. 29 is a vertical longitudinal section of the same. Figs. 30, 31, 32, and 33 are views of automatic mechanism for controlling the drop of some of the plungers in the casting-pot. Figs. 34, 35, and 36 are detail views of the clutch mechanism through which the operation of the justifying devices is controlled. Figs. 37, 38, 39, and 40 are views illustrating a modification and certain additional details of construction concerned in the casting and trimming or dressing of the type.

The machine-frame 1, Figs. 1, 2, and 3, may be of any preferred construction adapted to afford adequate support for the type casting, composing, and justifying mechanisms and their accessories.

At a convenient point in the frame 1 there is mounted a tilting casting-pot 2, Figs. 3, 5, and 37, which for the purposes of our present invention is preferably constructed with a plurality of receptacles or reservoirs 3, 4, 5, and 6, Figs. 3, 28, and 29. There may be provided only two of these receptacles or reservoirs—namely, one to contain a suitable molten type-metal or composition for casting the character-bearing type—such as letters of the alphabet, numerals, punctuation-marks, or other signs—and the other for containing molten lead or other soft metal suitable for the casting of slugs, blanks, or spaces.

As in composing or setting type some letters or characters are used with great frequency, while others are but seldom employed, it is desirable to divide the alphabet or character bearing type into groups with relation to the ordinary frequency or infrequency of employment required of the type as classified in separate groups. For this reason it is preferable to provide the casting-pot with a number of receptacles or reservoirs, as 3 4 5, corresponding to the preferred number of type groups for which the machine may be arranged, and with an additional receptacle or reservoir, as 6, for the molten soft metal from which required blanks or spaces are to be cast. This casting-pot or melting-pot and the said receptacles or reservoirs therein may be heated in any usual or convenient manner to maintain the contents of the several reservoirs in a suitable molten condition.

In the frame 1, at a point above the casting-pot 2, there is a cross-bar 7 and a hanger 8 to provide bearings for an intermittingly rotary shaft 9, Figs. 3, 4, 5, and 37, which carries on its forward end a mold-frame 10, that is preferably of rectangular form. This mold-frame or mold 10 is provided at or near opposite edges with a plurality or series of individual mold-cavities 11, arranged in separate groups, each comprising any desired number of mold-cavities, according to any suitable grouping of letters or other printing characters with relation to the usual or average proportions in which different letters or characters are required in composing. The several groups of mold-cavities 11 and an additional group of cavities 12, Figs. 1 and 4, for casting spaces will altogether correspond in number with the number of receptacles or reservoirs comprised in the casting-pot, as hereinafter described.

The matrices for casting the type characters are formed in matrix-blocks 13, that are preferably supported in cavities 14 of a matrix-supporting bar 15, Fig. 3, or 15ª, Fig. 37, which is to be so mounted that when the several parts of the casting mechanism are in operative position the said matrix-blocks 13 will close the mold-cavities 11 fluid-tight at their front ends, as shown in Figs. 3 and 37. There may be two matrix-bars 15, as shown in Fig. 3—namely, one for each set of mold-cavities—or there may be only one matrix-bar 15ª for both sets of mold-cavities, as shown in Fig. 37, the latter arrangement being preferable in most cases.

With the employment of two matrix-bars 15, as in Figs. 3 and 4, each of said bars may have its ends provided with arms 16, pivotally attached to the mold or mold-frame 10 at such points and in such manner that either matrix-bar can be folded closely against the mold, with the respective matrices in line with a set of mold-cavities for the casting of a set or group of type, and either matrix-bar can be swung away from a set of mold-cavities in proper time to permit ejection of the cast type. These movements of the two matrix-bars are effected automatically and at suitable intervals during each half-revolution of the intermittingly rotary mold or mold-frame 10, to which said matrix-bars are pivoted. For this purpose one end of each matrix-bar 15 may have projecting therefrom a pin 17, Fig. 4, located eccentrically to the pivots 18 of said bar. At right angles to the intermittingly rotary mold-frame 10 and below the central axis of the same or forward end of the shaft 9 there are located two pins or stops 19 and 20, Figs. 3 and 4, which may be supported as shown or in any other suitable manner. When the intermittingly rotary mold or mold-frame 10 has revolved in the direction of the arrow shown in Fig. 4 a sufficient distance to bring the pin 17 on the end of the lowermost matrix-bar 15 into contact with the lower stop 19, the continued rotation of the mold will cause said matrix-bar to swing on its pivot 18, and thereby move away from the adjacent set of mold-cavities, leaving the cast type therein, the matrices 13 easily drawing off from the raised characters on the forward or outer ends of the set of cast type. At the same time the body portion of the other or uppermost matrix-bar will come in contact with the upper stop 20 and be thereby swung to a position parallel with the mold 10 and with the matrices of said bar in close contact with the outer open ends of the other set of mold-cavities in readiness for casting another set of type. Thus by means of the intermittent rotation of the mold or mold-frame 10, in conjunction with the stationary stops 19 20, the two matrix-bars carried on said mold will be alternately swung into position parallel with said mold to coact with a set of mold-cavities therein for the casting of a set, group, or groups of type, and while one matrix-bar is thus automatically brought into operative position the other will be automatically swung away from its adjacent set of mold-cavities to permit ejection of cast type therefrom. Either matrix-bar 15 having been brought into operative position in the manner described, the completed half-revolution of the mold will carry said matrix-bar behind a pair of clamping lugs or abutments 21, Figs. 3 and 4, on a transversely-arranged bar 22 of the machine-frame. When the mold and matrix-bar are in this position, the rotary movement of the mold will be arrested, and then as the casting-pot 2 is swung or tilted forward, with its discharge mouth or orifices against the inner or rear ends of the mold-cavities, the mold and matrix-bar will be thereby securely clamped between the abutments 21 in front and the mouth of said casting-pot at the rear. The discharge mouth or mouths 23 of the casting-pot is or are covered by a guard-plate 24, Figs. 3, 5, and 37, having numerous perforations or orifices 25, corresponding with the respective mold-cavities, and it will be understood that when the casting-pot, mold, and matrix-bar are in perfect operative juxtaposition, as shown in Figs. 3 and 37, the said orifices of the guard-plate will communicate with the mold-cavities and at the same time there will be a reliable fluid-tight joint at both ends of said cavities to prevent any troublesome leakage of molten metal.

As shown in Figs. 3 and 4, the lower stop 19 for turning or swinging the matrix-bars may be supported from a downwardly-curved central portion of the bar 22, while the upper stop 20 may have an adjustable support 26, Fig. 3, on the back of the magazine in which the cast type are to be collected; but obviously any other suitable provision may be made for supporting these stops.

When only one matrix-bar 15ª, Figs. 37 and 38, is provided to coact with either of two sets of mold-cavities in the mold or mold-frame 10, the said bar 15ª will be mounted independently of the mold. This bar 15ª may be provided with legs 27 at its opposite ends. Below the said matrix-bar 15ª each of its legs 27 is pivotally engaged with a socketed portion of a bearing 28, secured to a bracket 29 of the machine-frame. The depending portion of each leg 27 is received in a recessed or slotted portion of a bracket 30, Figs. 37 and 38, two of which are secured to the front of the tilting casting-pot. Each leg 27 carries on its rear side a spring 31, adapted to bear against the rear end of the recess in the bracket 30, the front end of which supports a set-screw 32, arranged to provide an adjustable bearing for contact with the lower front side of the adjacent leg. When the casting-pot 2 is tilted rearward away from the back of the mold 10, the set-screws 32 will be carried by the brackets 30 into bearing contact with the front lower ends of the legs 27, thereby compressing the springs 31 and at the same time swinging the matrix-bar 15ª away from the front of the mold. After the mold-frame 10 is released from the clamping action of the casting-pot 2 and matrix-bar 15ª it can be turned one-half revolution to reverse the position of the two sets of mold-cavities, so that one set will be carried to the point where the cast type are to be ejected, while the other set of mold-cavities will be moved into proper position to coact with the casting-pot and matrix-bar in the production of another set, group, or groups of cast type. The movement of the casting-pot in being tilted to vertical position against the back of the mold will now cause the brackets 30, Fig. 37, to press the lower ends of the legs 27 forward, thereby swinging the matrix-bar 15ª into close fluid-tight contact with the mold-front in readiness for casting. The springs 31 impart a suitable resiliency to the mountings of the matrix-bar 15ª, and all the parts of the casting mechanism are so constructed and arranged as to secure fluid-tight joints at both ends of the mold-cavities.

The tilting of the casting-pot 2 forward and back at proper intervals may be effected by means of cams 33, Figs. 3, 5, and 37, on a rotary shaft 34, that is mounted transversely in a rear portion of the machine-frame. These cams 33 operate between and in contact with rollers 35, Figs. 28, 29, and 37, that are mounted in the bifurcated upper ends of arms or standards 36, secured to a rear upper portion of the casting-pot. The shaft 34 has mounted thereon a spur-gear 37, Figs. 1, 2, and 3, through which it is driven from a pinion 38 on a main driving-shaft 39, having a band-wheel 40 on one end. The rotary shaft 34 also carries a mutilated bevel-gear 41, Figs. 2, 5, and 6, adapted to mesh at intervals with a bevel-pinion 42, Figs. 3 and 6, on the shaft 9, for imparting intermittent rotation to the mold or mold-frame 10, as required by the intended operation of the machine in casting type and spaces or blanks.

To provide for the required forward and rearward tilting of the casting-pot 2, it has its front lower portion furnished with legs 43, that may be connected by pivots 44 to horizontal slides 45, Fig. 3, adjustably mounted in guides 46 on the machine-frame. These slides 45 and guides 46 may have a dovetailed engagement or be otherwise suitably connected, and any suitable means, such as slot 47 and pin or screw 48, Fig. 3, may be provided for securing the slides in adjusted position. By means of these or any other appropriate devices the casting-pot can receive any required adjustment with relation to the mold. In Fig. 37, however, the legs 43 of the casting-pot are shown as being pivoted directly to the machine-frame.

In the casting-pot 2 each receptacle 3, 4, 5, and 6 contains a plunger 49, Fig. 3, and a channel 50 leads upward from the lower part of each receptacle or reservoir to its mouth 23, so that when the plunger 49 is depressed or forced inward the molten type-metal or molten soft metal, as the case may be, will be caused to pass forcibly upward through said channel and mouth into the mold-cavities of the mold.

The stem 51 of each plunger 49 is extended through a cover 52 of the molten-metal reservoir and connects above the same with one end of a lever 53, that is fulcrumed intermediate its ends to one of several standards 54, located on the rear upper part of the casting-pot 2, as shown in Figs. 3, 28, and 29. On an outer end portion of each lever 53 there is a stud-bearing 55 for the upper end of an expansively-acting spring 56, that may have a bearing at its lower end on a collar 57, which is adjustable on a vertically-arranged guide-rod 58, the lower end of which preferably has a rocking bearing at 59 on the base of the machine-frame or other suitable support. The upper end of the rod 58 is made tubular to receive telescopically a reduced extension of the stud 55, as shown in Fig. 3, thus providing an expansible and contractible guide-support for the spring 56 to accommodate its required compression and expansion in the operation of the casting-pot plunger. The manner of supporting the lower end of the rod 58 permits said rod to rock with the tilting or swinging movements of the casting-pot. The collar 57 is clamped onto the rod 58 in such manner that it may be loosened and lifted or lowered to alter the adjustment of the spring 56, and a lock-nut 60 is provided on a screw-threaded portion of the rod 58, immediately below the collar 57, to more securely hold it in adjusted position. Any suitable means, such as a removable handle 61, Fig. 3, may be provided for lifting the collar 57, as well as turning the nut 60, for any required adjustment of the spring. The outer end of each lever 53 supports a roller 62 for contact with one of a series of cams 63 on the rotary shaft 34, Figs. 3 and 5, whereby the said levers are respectively operated to raise the several plungers 49, and at the same time compress the springs 56, so that as soon as a cam 63 revolves a sufficient distance to bring a cut-away portion thereof opposite a corresponding roller 62 the adjacent spring 56 will be free to expand, and thereby actuate the lever 53 in such manner as to depress the plunger 49, and thus cause it to forcibly expel some of the molten metal through the channel 50 and into the mold-cavities of the communicating group of such cavities in the mold. Each cam 63 is so shaped that in acting on an adjacent roller 62 it will lift the plunger gradually without permitting it to exert any suction on the molten metal in the channel 50, that might prevent perfect filling of the mold-cavities. At the same time the cut-away portions of the several cams 63 are so formed as to permit a quick or sudden action of the springs 56, that will cause the plungers 49 to be thrown down with such power as to forcibly expel or eject the molten metal through the channels 50 to the outlets of the casting-pot, and thence into the mold-cavities to completely fill the same.

As the type characters or signs of some groups comprised in a complete set of type are required much less frequently than others and would therefore unduly accumulate in some of the magazine-cells if all the type characters were produced in the same quantity at each operation of the machine, it is desirable not only to arrange the mold-cavities and matrices in groups corresponding with separate receptacles or reservoirs for molten metal, as hereinbefore described, but it is also necessary to provide appropriate automatic mechanism for controlling the operation of one or more of the casting-pot plungers in approximate accord with the usual requirements for the production of different groups of type characters, letters, numerals, punctuation-marks, and other signs in varying quantities suited to the ordinary demands for different printing characters in the work of composing. This may be accomplished by automatically locking and unlocking some of the casting-pot plungers (one or more) so that such plungers or plunger will be operated only at comparatively long intervals. For this purpose any casting-pot plunger that is to be operated only at comparatively long intervals may have its lever 53 normally locked in an inoperative position by means of a depending hook 64, Figs. 3, 5, 32, and 33, pivotally suspended from a convenient portion of the machine. A suitably-arranged spring 65 is provided for each hook 64 to hold it normally in engagement with the under side of the forwardly-extended arm of the lever 53, so that said forward lever-arm cannot be moved downward to depress the plunger, the spring 56 being meanwhile held under compression by the depressed rearward arm of said lever. At a suitable point on each locking-hook 64 there is a laterally-projecting arm 66, having a beveled end portion engaged in a circular channel or groove 67, that is formed in one side of a ratchet-wheel 68, Figs. 3, 5, 30, 31, and 33, having its axis coincident with the pivot or fulcrum of the plunger-lever. By reference to Fig. 5 it will be observed that each ratchet-wheel 68 has a hub 69 extended between two of the standards 54 in which the plunger-levers 53 are mounted. The axis or shaft of each ratchet-wheel serves also as a pivot for the adjacent levers. In the channel or groove 67 of the ratchet-wheel 68 there is a cam projection 70 (one or more) for contact at suitable intervals with the beveled end portion of the arm 66 on the spring-pressed hook 64 that locks a plunger-lever. Each cam projection 70 may be beveled to correspond with the beveled end of the hook-arm 66, so as to more readily engage and ride over said arm as the ratchet-wheel is revolved. It will be obvious that when the cam projection 70 is made to bear against the arm 66 the hook 64 will be forced back against the pressure of its spring 65, thereby releasing or unlocking the plunger-lever. Then after the casting-pot has swung in close contact with the mold and the cam 63 has revolved sufficiently to relieve the lever 53 from pressure the compressed spring 56 will suddenly expand and cause the lever 53 to force the plunger 49 downward to shoot a quantity of molten metal through the channel 50 to the pot-mouth and thence into the mold-cavities that communicate with the particular molten-metal reservoir in which the operated plunger is located. As soon as the plunger 49 is again lifted by the cam 63 bearing against the lever 53 the spring 65 will cause the locking-hook 64 to again engage the lever 53 and hold it in an elevated and locked position until again released, as above described. The ratchet-wheel 68 may be provided with only one cam projection 70 or with any required number of such projections, according to the desired intervals in the operation of the accompanying plunger. In Fig. 30 the ratchet-wheel 68 is shown as having one cam projection, while in Fig. 31 another ratchet-wheel is provided with two projections 70, but it is to be understood that the number of these cam projections will correspond with the periods for unlocking a plunger to permit its required operation. It has been shown that the ratchet-wheels 68 are mounted on a rear upper portion of the casting-pot 2, coincident with the pivots of the plunger-levers. These ratchet-wheels are rotated intermittingly in a forward direction on each rearward tilting movement of the casting-pot. For this purpose a pawl 71, Figs 5 and 30, is pivoted to a fixed portion of the machine-frame in suitable position above the ratchet-wheel and in engagement therewith. A spring-detent 72 should be arranged to engage an under portion of each ratchet-wheel to prevent backlash. Thus as the casting-pot 2 is swung or tilted rearward the ratchet-wheels 68 will be rotated forwardly by having their teeth engaged with the fixed pawls 71, the movements of said ratchet-wheels being intermittent or step by step. When a cam projection 70 of a ratchet-wheel has forced back the locking-hook 64 of a plunger-lever 53, thereby releasing said lever, and the succeeding forward tilting movement of the casting-pot has brought its discharge-mouth in coincidence with the mold-cavities, the cams 63, Fig. 3, will have revolved sufficiently to bring their cut-away portions over the rollers 62 of the plunger-levers, thereby releasing all the plunger-levers except such as may remain automatically locked, and then the several compressed springs 56 will actuate the unlocked levers 53 to cause the connected plungers to descend and force molten metal into the mold-cavities. It will be understood that automatic locking devices such as the hooks 64 are provided only for the levers 53 of those plungers 49 which are to operate at comparatively long intervals. Those plungers (one or more) which are to operate at every revolution of the cams 63 need not have their levers provided with any automatic locking mechanism to render them temporarily inoperative. Thus with, say, four groups of mold-cavities and a corresponding number of molten-metal reservoirs and their plungers, Figs. 4, 5, 28, and 29, it may be advisable to provide automatic locking devices for only two of the plunger-levers, as shown in Fig. 5; but it will be understood, of course, that this number of automatic locking devices may be increased or diminished, according to the frequency with which certain groups of type characters are to be cast. It is considered that the provision of means for automatically controlling the frequency with which one or more groups of type characters are to be cast is a novel and very important feature of this machine, valuable not only in preventing the unnecessary casting and accumulation of such type characters as are only seldom required, but also in avoiding undue wear of machine parts. Obviously, however, the automatic plunger-locking mechanism could be omitted or temporarily disconnected should it be desired to have all the plungers operate with the same frequency.

On the rotary shaft 34 there is carried a spur-gear 73, Figs. 3 and 5, meshing with a spur-gear 74 on a shaft 75, from which are operated appropriate mechanisms for ejecting the cast type from the mold-cavities and transferring them to the magazine-cells. The shaft 75 has its bearings in suitable hangers 76, suspended from a cross-bar 77 at the top of the machine-frame. The gear 74 may be secured to one end of the shaft 75 and is provided with a wrist 78, Fig. 5, while the other end of said shaft 75 carries a disk 79, having a wrist 80 thereon. These wrists 78 and 80 are for the attachment of pitmen 81, connecting with a sliding ejector-head 82, Figs. 2, 3, 7, and 37. This ejector-head 82 may have its ends slidingly supported on raised ledges 83, Fig. 7, at or near the ends of a cross-bar 84 in the machine-frame. Near its ends the cross-bar 84 supports vertical side pieces 85, that are also extended forwardly beyond the front of said bar. In these side bars 85 there are guides 86, Fig. 7, for the sliding ejector-head. On a rear portion of the ejector-head 82 are located suitable lugs 87, Figs. 2 and 7, for pivotal attachment of the forward ends of the pitmen 81, through which said ejector-head is actuated.

For the purpose of ejecting the cast type from the mold-cavities the forward portion of the ejector-head 82 carries a number of ejector-fingers 88, arranged in groups that correspond with the groups of mold-cavities. The ejector-fingers 88 have each a diameter that will permit them to enter freely into the several mold-cavities to eject type therefrom, and in order that they may be made to properly register or coincide with the said mold-cavities there is a guide-bar 89 arranged along the front of the cross-bar 84 that supports the ejector-head. This guide-bar 89 is provided with apertures for passage of the ejector-fingers and to guide said fingers, so that they will always properly register with the mold-cavities.

In order that the rotary rectangular mold-frame 10 may be held perfectly stationary and square during the casting of type in the lower set of mold-cavities and during the ejection of cast type from the upper set of mold-cavities, there may be provided on the ejector-head 82 some suitable stop devices, such as arms 90, that project forward from opposite ends of said ejector-head. As shown in Fig. 7, the forward end of each arm 90 is preferably beveled on its inner side to more readily engage the perpendicular edges of the mold-frame, so as to arrest the movement of the mold at the proper time and hold the mold firmly during the casting of one set of type and the ejection of a previously-cast set. As shown in Fig. 3, however, the arms 90 are not the only devices provided for arresting rotation of the mold-frame 10 at the proper time. An additional stop device is provided by means of a spring-pin 91, mounted in one of the bearings 7 of the rotary shaft 9, by which the rectangular mold-frame 10 is carried. This spring stop-pin 91 is so arranged with relation to a notch in the shaft 9 that said pin and notch will engage each other, and thereby arrest rotation of the shaft 9 and mold 10 coincidentally with disengagement of the mutilated gear 41 and pinion 46 that are concerned in the intermittent rotation of the mold. At the same moment the arms 90 are moved forward into engagement with the perpendicular edges of the rotary mold-frame, and thus by conjoint action of the arms 90 and spring-pin 91 the rotary mold is stopped and securely held in operative position for the casting and ejection of type until a partial rotation of the mold again becomes necessary. By this time the arms 90 are withdrawn and the spring-pin 91 will readily yield to rotation of the shaft 9 as actuated by its driving-gear.

As clearly shown in Figs. 1, 7, and 37, the forward end or head of each side piece 85 is provided with an upwardly-extended lug 92 and a downwardly-extended lug 93, having perforations 94 and 95, respectively. The forward end or head of each side piece 85 is provided also with an inwardly-extended lug 96, having a perforation 97 therein.

In the lower lugs 93 of the two side pieces 85 there is detachably mounted a shiftable reversing and transferring bar 98, Figs. 1, 2, 3, 7, 8, and 37, for reversing the cast type and transferring them to the magazine-cells butt end downward. A suitable screw-pivot 99 is provided for each end of this bar 98, so that it can be readily removed and replaced. In the reversing and transfer bar 98 there are provided a suitable number of passages 100, arranged in groups corresponding with the groups of mold-cavities and adapted to register therewith. These passages 100 of the reversing and transfer bar 98 are adapted to register also with appropriate cells of the magazine hereinafter described.

When the reversing and transfer bar 98 is in readiness to receive cast type from the mold-cavities, it will occupy a substantially horizontal position, as shown in Figs. 1, 2, and 3; but it is shiftable to an inclined or approximately vertical position, as shown in Fig. 8, for the purpose of reversing the type and transferring them to the magazine-cells butt-ends downward. The required movements of the bar 98 are effected through arms 101, rigidly secured to its ends. At their outer ends these arms 101 are pivotally connected with links 102, which in turn are pivotally connected with levers 103, Figs. 2 and 3, that are rigid on a rock-shaft 104, which is mounted in bearings 105 on the top of the machine-frame. The levers 103 may be secured to the rock-shaft 104 by means of collars 106, Figs. 1 and 2, and in a similar manner, by means of a collar 107, there is secured to said rock-shaft intermediate the ends a downwardly and rearwardly curved arm 108, Fig. 3, supporting a roller 109 for contact with a cam 110 on the rotary shaft 75, Figs. 3 and 5, and through which the reversing and transfer bar 98 is operated. While the enlarged portion of this cam 110 is traveling in contact with the roller 109 the cam 108 is pushed forward, thereby rocking the shaft 104, and thus lifting the levers 103, so as to cause the links 102 to shift the reversing and transfer bar 98 from the position shown in Fig. 3 to the position shown in Fig. 8. By this movement of the bar 98 the cast type carried therein are reversed or brought into such position that the type characters will be uppermost, this being the preferred position of the type as accumulated in the cells of the magazine. The enlarged portion of the cam 110 has an extent of surface sufficient to cause the reversing and transfer bar 98 to remain in the position shown in Fig. 8 during the time required for transferring type from the passages of said bar into those magazine-cells that are not already completely filled with type. For the purpose of insuring a prompt return of the reversing and transfer bar 98 to the required position for receiving another supply of cast type from the mold-cavities there are provided coiled springs 111, Fig. 2, on the rock-shaft 104, near its ends, the said springs being each engaged at one end with one of the shaft-bearings 105 and at its other end with one of the collars 106 of the levers 103. These springs are put under tension when the shaft 104 is rocked in a direction to lift the levers 103, and as soon as the enlarged portion of the cam 110 has passed the roller 109 said springs will restore the levers 103 and connected bar 98, besides serving at all times to hold the roller 109 in position to be acted on by said cam.

In each cell or passage 100 of the reversing and transfer bar 98 there is arranged a spring 112, Fig. 8, to press against one side of the type and prevent them from falling out while said bar is being shifted or swung from one of its positions to the other. Each spring 112 is fastened at its inner end and has its outer end extended a suitable distance beyond the transfer-bar. Intermediate its ends each spring 112 is provided with a swell or bend 113 to come normally in contact with one side of a type contained in the bar 98 and exert sufficient pressure or friction to prevent the type from dropping out when the bar is shifted. In order to release the type when the passages 100 of the bar 98 are in register with the magazine-cells, there is provided a swinging releaser-bar 114, Figs. 3, 7, and 8, which is constructed to provide bearings 115 and 116 for the outer ends of the two rows of springs 112, Fig. 8, in the corresponding passages of the transfer-bar. This releaser-bar 114 is provided at its ends with standards 117, having perforations 118 therein for passage of pivot-screws, such as 99, Fig. 7, by which to pivotally suspend said bar 114 at the perforations 94 of the upwardly-extended lugs 92 on the side pieces 85, hereinbefore described.

On its front the swinging releaser-bar 114 is provided with forwardly-projecting pins 119 to serve as guide-stems for spiral springs 120, each of which has a bearing at one end against said swinging bar 114 and at its other end against one of the fixed lugs 96 on the forward end of a side piece 85, as shown in Fig. 3, while the perforations 97 of the lugs 96 afford passage for the guide-stems or pins 119 in the forward and backward movement of the releaser-bar. On the rear side the swinging releaser-bar 114 is provided with cam projections 121, Figs. 2, 3, 7, and 8, that are preferably beveled at their upper ends, as shown. For the purpose of pushing the releaser-bar 114 forward, so as to cause its bearings 115 and 116 to press forcibly against the projecting ends of the springs 112, and thereby release the type in the bar 98, as shown in Fig. 8, there are provided two pivotally-mounted levers 122, Figs. 2, 3, 7, and 8, each of which is fulcrumed intermediate its ends to the inner side of one of the vertical side pieces 85 on the machine-frame. Each lever 122 carries at its forward end a roller 123 to contact with a cam projection 121 of the releaser-bar 114 and ride upward and downward thereon. At its rear end each lever 122 carries a roller 124 to ride on a cam projection 125, that is arranged horizontally on each of the arms 90, forming part of the ejector-slide 82, Figs. 3 and 7. Each cam projection 125 is so constructed as to be readily engaged with and disengaged from the roller 124 in the forward and backward movements of the ejector-slide, and springs 126 are provided to bear on the inner or rear ends of the levers 122 to press the rollers 124 downward onto the cam projections 125 or their supports as said rollers pass from one onto the other in the forward and backward movements of the ejector-slide. It will be obvious that by means of these cam projections 125 and springs 126 a succession of oscillatory movements will be imparted to the levers 122 during the reciprocations of the ejector-slide. When the forward or outer ends of the levers 122 are thus depressed, the rollers 123 will be caused to travel downward on the cam projections 121 of the releaser-bar 114, thereby forcing said bar forward, so that its bearings 115 and 116 will press the springs 112, Fig. 8, away from the type in the downwardly-swung transfer-bar 98 and permit said type to drop into their appropriate cells of the magazine, provided such cells are not already filled. About the time that the transfer-bar 98 is to be shifted into position to receive more type from the mold the cams 125 will have moved from beneath the rollers 124 and the springs 126 will force down the adjacent ends of the levers 122, so as to cause the rollers 123 to travel upward along the cam projections 121 of the releaser-bar 114, which will then be forced rearwardly by its springs 120, Fig. 8, thereby relieving the type-holding springs 112 from pressure, so that by their resiliency they will fly into frictional bearing contact with any type remaining in the passages 100 of the transfer-bar 98 and prevent them from dropping out as said bar is shifted to position in front of the mold.

By reference to Fig. 8 it will be observed that the several passages of the transfer-bar 98 have each a capacity to receive two type resting one against another end to end. Now when this transfer-bar is again supplied with type from the mold any type already contained in the passages of said transfer-bar will be pushed forward by the fresh type ejected from the mold. Should there be only one type remaining in a passage 100 of the transfer-bar, said type will be pushed to the outer end of such passage. If there are two type already contained in a single passage 100 of the transfer-bar, the outermost type will be wholly ejected by the entry of a fresh type into said passage. The surplus type thus ejected from the transfer-bar 98 may be automatically carried into the casting-pot by means of an inclined trough-shaped runway 127, Figs. 1, 2, and 3, or by any other suitable mechanism.

During the partial revolution given to the mold-frame 10 for the purpose of carrying a set of mold-cavities from the casting position to the ejecting position the butt-ends of a set of cast type contained in the mold-cavities may be trimmed or dressed by being brought successively against the edge of a trimming knife or cutter 128, Figs. 1 and 4, that can be mounted diagonally at the back of the rotary mold-frame.

It may sometimes be preferable to at first make the cast type of a diameter slightly in excess of normal and then trim down the type-body on its several sides to secure uniformity and perfect smoothness. For this purpose a perforated dressing or trimmer bar 129, Figs. 37 and 40, may be secured to an upper portion of the machine-frame in such manner as to extend parallel with and in front of the uppermost set of mold-cavities in the rotary mold-frame. If desired, this trimmer 129 may be detachably secured at its opposite ends to brackets 130, Fig. 39, mounted on convenient portions of the machine-frame. The trimmer 129 is constructed with groups of perforations or passages 131, corresponding with the groups of mold-cavities and with the groups of passages in the transfer-bar 98 and adapted to coincide with each when all these parts are in an operative position for the ejection of type from said mold-cavities and through the passages of said trimmer into the appropriate passages of the reversing and transfer bar. On its working face the trimmer 129 is provided with cutting edges 132 at the margins of the passages 131, so that as the cast type are ejected from the mold-cavities into and through said trimmer-passages the sides of the type will be dressed to slightly reduce the diameter of the type-bodies and remove any surface irregularities.

By reference to Figs. 3 and 8 it will be observed that the cast type from the mold-cavities are delivered through the passages 100 of the shiftable transfer-bar 98 into a magazine 133, provided with appropriate cells 134, in which the various kinds of type characters comprised in the several groups are distributed according to their kind, the individual type of each kind being accumulated in columns and the several type resting end to end, one upon another. This magazine 133 may be constructed from any suitable material and in any convenient manner to accord with the requirements of type setting or composing. As shown in Figs. 1 and 2, the type-magazine 133 may be supported by brackets 135 on the machine-frame, with suitable adjusting devices 136, Fig. 3, at the back to set the magazine at any desired or necessary inclination.

In the bottom of the magazine 133 each column of type in the rear tier of magazine-cells 134 is supported on a ledge 137, Figs. 3, 8, and 10, and each column of type in the front tier of cells is supported on shoulders 138, Figs. 3, 10, and 13, between comb-like abutments 139, Figs. 8, 10, and 13, projecting upwardly from the front lowermost section or part of the magazine. A bar 140, Figs. 3, 8, and 10, may be provided to close the lowermost portions of the forward tier of magazine-cells at the front and to serve as a guide in properly directing downward the released type from that tier of cells. At the back of the lower part of the magazine 133 there is provided a plurality of guideways 141, Fig. 11, for the arms 142 and 143, Fig. 12, that are to push off the lowermost type in each column and release the same from their respective magazine-cells. These guideways 141 may be formed by appropriately grooving the opposed faces of two partly-separated and horizontally-arranged parallel bars 144 145, that are superposed one on the other and securely fastened together. The upper bar 145 may have thereon an upwardly-extended flange 146 to brace the lower part of the magazine, as shown in Figs. 3, 8, and 10. It will be noticed by reference to Figs. 3, 8, and 9 that the individual type-cells 134 comprised in the two tiers, front and rear, alternate with each other to correspond with the arrangement of the mold-cavities and other type-passages hereinbefore described, and more particularly to permit access of those pusher-arms 143 that are to eject type from the lowermost ends of the front tier of magazine-cells. Of course the lowermost portion of each magazine-cell 134 in both tiers or rows is open at the back to permit passage of the pusher-arms 142 and 143, as will be seen by reference to Figs. 3, 8, 10, and 13. The forward ends of the pusher-arms 142 and 143 are provided, respectively, with rearwardly-inclined elbows 147 148, Figs. 8, 10, and 12, the front faces of which are parallel with the type-bodies and substantially coextensive therewith to be the better adapted to push off bodily the lowermost type in each column, so that said type will be properly directed to and through the exits 149 and 150 of the magazine. It will be observed that the elbow portions 148 of the pusher-arms 143 are extended a sufficient distance from front to rear to serve at all times as sliding partitions between the lowermost portions of the rear tier of magazine-cells 134, so that the lowermost type in the rear tier of cells cannot fall against each other.

The pusher-arms 142 143 are actuated in a forward direction by means of angled key-levers 151, Fig. 3, the rear upper ends of which are flexibly connected with the rear ends of the respective pusher-arms. Each pusher-arm is provided with a spring 152 for restoring it to its normal position after it has been moved forward to release the type from the magazine. As fast as the type are released from the magazine in the order in which the key-levers 151 are struck by the fingers of the operator they are received upon a rapidly-moving endless apron 153, Figs. 1, 2, and 3, that is mounted in a forwardly-inclined position below and in front of the magazine. At its lower end portion the endless inclined apron 153 is carried on and actuated by a roller 154, mounted on a rotary shaft 155, having a driving-pulley 156 on one end. The upper portion of the endless type-carrier apron 153 passes over an idler-roller 157 on a shaft 158, having its bearings provided with suitable adjusting devices 159, through which the roller 157 can be adjusted to control the tension of said endless apron. An inclined table or board 160, Fig. 3, may be arranged beneath and against the working upper side of the endless type-carrier apron 153 to serve as a guide for the same and prevent sagging.

It will be readily understood that individual type released from various magazine-cells are delivered at all points upon an uppermost portion of the working surface of the endless type-carrier apron. For the purpose of guiding these several type one after another to a common point of discharge at or near a lower portion of the inclined endless apron there are provided a pair of converging guides 161, that are arranged in close proximity to the upper face of said apron, as shown. At and near their lower ends these guides 161 are brought quite close together and form the sides of a tubular type-spout 162, Figs. 1, 2, 3, and 19, that is closed on all sides and may be substantially rectangular in cross-section. In some views—viz., Figs. 1, 2, and 3—one side or cover portion of the type-spout 162 is omitted for clearness of illustration, the preferred form of completed type-spout being shown in Fig. 19. By reference to Figs. 1, 2, 3, and 14 it will be seen that this tubular type-spout 162 is curved at first laterally and then downward as it passes over the lower edge of the endless type-carrier apron.

At its lower end the type-spout 162 communicates with one end of a horizontally-placed assembling-box 163, Figs. 1, 2, 3, 15, 16, and 19, in which the individual type discharged successively from said spout are assembled and held in line. As shown in Figs. 1 and 3, the assembling-box 163 may be supported on a cross-bar 164 of the machine-frame. In the top of this bar 164, at one side of the assembling-box, there is a dovetailed groove 165, that receives a tenon or dovetailed rib 166 on the under side of a horizontally-sliding block 167, Figs. 1, 2, 3, 16, 17, and 18, which is provided with parallel vertically-extended lugs 168 at one end. The other end of the sliding or reciprocating block 167 is offset to one side to provide a suitable point of attachment for a type-line pusher-bar 169, that is extended parallel with said block, but offset therefrom, as shown in Figs. 2, 16, and 17. In the side of this pusher-bar 169 there is a longitudinally-extended dovetailed groove 170 to receive and guide the stem 171 of a vibrator 172, Figs. 15, 16, and 17, by which the type are assembled in line as they are successively dropped from the type-spout 162 and in front of the retracted vibrator. One side of the vibrator-stem 171 is provided with a projecting pin or lug 173, that is acted on by a cam 174 to move the vibrator 172 forward in the assembling-box. On the other side of the stem 171 there is a pin or stud 175, Figs. 16 and 22, to be acted on by a spring 176 for retracting the vibrator 172 when the cam 174 has snapped off from the pin 173. At this instant another cam 177, Figs. 15 and 16, rides over a pin 178, projecting from one side of a lever 179, which has a pivotal support 180 at its lower end. To the upper end of the lever 179 there is attached one end of a longitudinally-movable rod 181, the other end of which has a sliding connection with a perforated or slotted lug 182 on one end of a two-armed lever 183, that is fulcrumed to one side of the type-spout 162, as shown in Figs. 1, 3, 15, and 19. The other end of this two-armed lever 183 is provided with a lateral projection 184, carrying a type-stop 185, Fig. 15, that normally projects into the type-spout 162 through an opening in one of its sides, a spring 186 being arranged to bear against the projection 184 of the lever 183, so as to hold the movable stop 185 in required position within the type-spout 162 until the cam 177 passes onto the pin 178 of the lever 179, Figs. 15 and 16. By this action of the cam 177 the lever 179 is swung over against the pressure of a spring 187, bearing on said lever, and by means of the rod 181 the lever 183 is oscillated against the pressure of its spring 186, so as to withdraw the type-stop 185 from the type-spout 162, thereby permitting discharge of a type that is resting on said stop. It will be understood that when each individual type is discharged from the type-spout 162 in the manner described the vibrator 172 is in its retracted position. Before the vibrator 172 was retracted a spring-catch 188, Figs. 15, 16, and 19, snapped into engagement with the last type delivered into the assembling-box, thereby preventing said type from falling over into the path of the next type coming from the type-spout. After a type has been released from the type-stop 185 and discharged into the end of the assembling-box the cam 177 will ride off from its engagement with the stud 178 of the lever 179, and then the springs 186 and 187 will restore the type-stop 185 and its lever connections to normal position. The cams 174 and 177 are carried by a rotary shaft 189, mounted in suitable bearings in a bracket 190, Fig. 3, and on this shaft 189 there is a grooved pulley 191 for attachment of a belt 192, through which the cam-shaft 189 is driven from a peripherally-grooved portion of a band-wheel 193, as shown in Figs. 1, 2, and 3. As each type drops from the type-spout 162 and into the assembling-box 163 in front of the retracted vibrator 172 it assumes a vertical position and is quickly advanced, together with the preceding type, by the next forward movement of said vibrator. The head or end of the spring-catch 188 is beveled or rounded, as shown, to more readily yield to the advancing type as it enters the line of type being assembled. In order to prevent the forward end of the advancing line of type from tilting over, there is provided a yielding abutment 194, Figs. 2, 16, 20, and 21, which is constructed on one face with parallel horizontally-arranged lugs or bearings 195 195, one of which normally projects over the side of the assembling-box 163, while the other enters said box through a longitudinal slot 196 therein, thus serving to hold the forward type upright while the line is being assembled. This yielding abutment 194 has attached thereto a stem 197, that is partly received in the tubular or socketed end of a laterally-movable arm 198, Figs. 16 and 20, the other end of which may be pivoted to a convenient fixed portion of the machine-frame, as indicated in Fig. 2. As the line of type is advanced along and in the assembling-box 163 the abutment 194 and its arm 198 will yield against the pressure of a spring 199, Fig. 2, that bears on said arm in such direction as to hold the said yielding abutment in normal operative position while a line of type is in process of assembly. On the stem 197 of this yielding abutment 194 there is placed a coiled spring 200, Figs. 16 and 20, that normally holds said abutment in such position that its lugs or bearings 195 will project into the path of the advancing line of type and immediately preceding the forward type while the line is being assembled, thereby holding the type upright. As shown in Figs. 2, 16, 19, and 22, the side of the assembling-box 163 next to the yielding abutment 194 is provided with an incline 201, into which the slot 196 is extended. This incline 201 is so located that the yielding abutment 194 will begin to ride thereon about the time that the assembled line of type is completed. In the passage of the abutment 194 along the incline 201 the abutment-lugs 195 will be gradually withdrawn from the path of the advancing line of type, the abutment-spring 200 being meanwhile compressed. As the yielding abutment is withdrawn from the assembling-box the advancing line of type receives on one side the pressure of a flat spring 202, Figs. 1, 22, and 27, which serves to retain the assembled line of type in proper vertical position while being transferred to the justifier mechanism. This spring 202 is yieldingly secured at one end to a fixed abutment 203, Figs. 1 and 22, which forms one side wall of the justifier. Near or toward its other end the spring 202 is provided with upward and downward extended yielding arms 204 for attachment to the opposite side wall 205, in which there is an opening 206, Fig. 23, for permitting the line of assembled type to enter the justifier. The free end 207, Fig. 27, of this flat spring 202 coincides with an open-ended slot 208, Figs. 19 and 22, in the end of the assembling-box 163, and thus exerts a suitable side pressure on the advancing line of type to hold the same erect when the yielding abutment 194 is withdrawn.

While the vibrator 172 is at work assembling type in a line within the assembling-box 163, the slide-block 167 and rigidly-attached line-pusher 169 will remain at rest until the assembled type-line is to be justified or brought to standard length by compression of the soft-metal spaces included in said line. During the operation of assembling a type-line the band-wheel 193 revolves loosely on its shaft 209, which is mounted in suitable bearings 210 on the frame of the machine. This shaft 209 has secured thereto a clutch-disk 211, Figs. 2, 3, 34, and 36, in which a peripheral groove 212 is provided. The groove 212 is intersected by a transverse passage 213, in which is located a spring-latch 214, Fig. 34, adapted to be engaged with any one of a series of radially-arranged locking-recesses 215 in one side of the band-wheel 193, Figs. 34 and 35. A spring 216 is attached to the disk 211 in position to bear on the latch 214 and force it into engagement with one of the recesses 215 of the loose band-wheel; but normally said latch is held out of engagement with the band-wheel 193 by means of a bolt, rod, or detent 217, Figs. 3 and 34, the upper end of which is normally engaged in a notch 218 of the spring-latch 214, while its lower end is attached to the inner end of a clutch-lever 219, Figs. 2 and 3, which is to be used for putting the justifier mechanism in operation. A spring 220, Fig. 3, is connected with this lever 219 at a suitable point to normally lift that end of said lever to which the detent 217 is attached, thereby causing the upper end of said detent to enter the notch 218 when it coincides with the peripheral groove 212 of the clutch-disk 211, one end of said notch being beveled, as shown in Fig. 36, to facilitate its engagement with the detent.

When the type-line is ready to be moved into the justifier, the operator will lift the clutch-lever 219, which fulcrums on a pivot 221, Fig. 3, the rear or inner end of said lever being thereby thrown down, so as to withdraw the rod or detent 217 from the notch 218 of the latch 214, and the said latch being pressed on by its spring 216 will then engage in one of the recesses 215 of the revolving band-wheel 193, which is thus clutched to its shaft 209, so as to cause the same to revolve.

On the shaft 209 there is carried a cam 222, having on one side a wrist 223 for attachment of a pitman 224, Figs. 1, 2, 3, 16, and 22, which also pivotally connects with the lugs 168 on the slide-blocks 167, to which the type-line pusher 169 is attached. As the slide-block 167 and line-pusher 169 move forward the pin 173, Figs. 15 and 16, is carried beyond reach of the cam 174, and then the spring 176, acting on the pin 175, will retract the vibrator 172 into a cut-away portion 225 of the forward end of the line-pusher 169, Figs. 1, 17, and 23, so that the forward ends of said parts 169 and 172 will be in the same vertical plane to act bodily and conjointly against the rear end of the type-line for pushing said line into the justifier and to serve as a movable abutment, in conjunction with the fixed abutment 203, Figs. 1, 22, and 23, in compressing or justifying the type-line. By reference to Figs. 1, 2, 15, 16, 17, and 22 it will be observed that the line-pusher 169 is offset from its supporting slide-block 167, parallel therewith and projecting somewhat in advance, the arrangement of said parts with relation to the assembling-box 163 being such as to facilitate a proper transfer of the assembled type-line to the justifier.

As the type-line enters the justifier it is received on an elevator 226, Figs. 1, 23, 24, and 25, that is movable up and down between the side walls 203 and 205 of the justifier-chamber. Vertical guides 227 227, Figs. 1, 24, and 25, are secured along the front lower parts of the side walls 203 205 and may be connected by a cross-strip 228 at their upper ends. These parts 227 228, together with the back 229 of the justifier-frame, serve to retain the elevator 226 in vertical position. One vertical edge of the elevator 226 is provided with upper and lower notches 230, Fig. 23, to be alternately engaged by a spring-pin 231 for causing the elevator to dwell at each end of its stroke without being immediately affected by its actuating mechanism. The lower end of the elevator 226 is provided with parallel vertically-arranged slots 232, (designated by dotted lines in Fig. 23.) These slots 232 are engaged by pins 233, projecting horizontally from a vertically-movable block 234, through which the elevator is actuated in proper time movements, there being in the front lower portion of said block a recess 235 for receiving the pivotal upper end of a depending link 236, Figs. 1, 23, 24, and 25, the lower end of which is pivotally connected with one end of a two-armed lever 237, Figs. 1 and 3, which carries in its other end or arm a roller 238 for contact with the periphery of the cam 222, from which the slide-block 167 and attached line-pusher 169 are also actuated. A spring 239, Fig. 1, is connected with this lever 237 for holding the roller 238 in contact with the cam 222 and to assist in swinging said lever on descent of the type-line elevator. On the front upper portion of the vertically-movable block 234 there is an upright arm 240, that is extended through and beyond a bridge-piece or looped guide-bracket 241, Figs. 1, 24, and 25, which is secured to the front of the justifier-frame. The upper end of this vertically-movable arm 240 carries a roller 242 to travel along the front of an oscillatory and vertically-arranged arm 243, Figs. 1, 24, 25, and 26, which is provided near its upper end with a cross-head 244 for sweeping an elevated type-line from the top of the elevator 226 and into a galley or tray 245, in which successively-justified lines of type are accumulated. The lower end of the oscillatory arm 243 is provided with a laterally-extended tubular bearing 246, Fig. 26, through which said arm is pivotally mounted within the bracket 241, as shown in Figs. 24 and 25. At its upper end the oscillatory arm 243 is formed with progressive inclines 247 and 248, on which the roller 242 will travel to permit a forward swing of said arm 243 under the pressure of a spring 249, Figs. 24 and 25, bearing against the rear face of the arm, said spring 249 being secured to the front of a guide-board 250, that forms the front upper portion of the justifier, and also serving to prevent the type-line from falling forward while being elevated to the galley.

When the type-line is pushed fully into the justifier along the top of the elevator 226, which is then in its lowermost position, Fig. 23, the type-line will at first receive a preliminary endwise compression between the justifier-abutment 203 and the type-line pusher 169, actuated by the slide-block 167, to which said pusher is attached. By this preliminary compression the type-line is brought approximately to the required length, which may be a little in excess of a standard length to which it is to be finally reduced. This results from a partial compression of the soft-metal spaces included in the type-line. In this preliminary justifying of the type-line due to compression of the soft-metal spaces it may be that said spaces will bulge or swell a little to the front, and therefore for the purpose of trimming them at this point there is provided a knife-edge 251 along the bottom of the guide-board 250, that constitutes the front upper part of the justifier. When the cam 222 begins to act on the lever 237, the link 236 will lift the block 234 without at first affecting the type-line elevator 226, which will dwell in its lowermost position, by means of the pin-and-slot connection between it and said block 234 and through engagement of the spring-pin 231, Fig. 23, in the uppermost notch 230 of said elevator; but when the pins 233 of the vertically-moving block 234 are thus made to engage the upper ends of the slots 232, Fig. 23, the spring-pin 231 will yield, and then the elevator 226 will also move upward, and consequently as the soft-metal spaces included in the type-line are carried past the knife-edge 251 any lateral bulge or swell of said soft-metal spaces due to the compression previously exerted will be trimmed off. As the elevator 226 continues to rise the type-line thereon is carried to the upper part of the justifier-chamber, between its back 229 and front 250, Figs. 24 and 25, and one end of said type-line will be thereby caused to ride vertically over or along a metal justifier-abutment 252, Figs. 23 and 24, that is adjustably set into an upper part of one end wall of this justifier-frame. It will be seen that this justifier-abutment 252 projects slightly into the path of the upwardly-moving type-line, at one end thereof, so that as the type-line is carried upward it will receive its final endwise compression, whereby all the type-lines in succession are uniformly justified or brought to the same length due to varying compression or yield of the soft-metal spaces included in the successive lines of type, each type-line taking just that degree of compression that is necessary to reduce it to a standard length. As shown in Fig. 23, this justifier-abutment 252 may be provided at its back with dowels 253 and a set-screw 254 for adjusting said abutment as required.

While receiving its final endwise compression in passing the justifier-abutment 252, the type-line is closely confined between the back wall 229 and front wall 250 of the justifier-chamber, as shown in Fig. 25, and consequently the lead or soft-metal spaces are not allowed to expand laterally, and no further trimming thereof will be required.

While the type-line elevator 226 is being moved upward, the roller 242 on the arm 240 will travel along the oscillatory arm 243, Figs. 24 and 25, and the spring 249 will be held under compression until the roller 242 passes onto the inclines 247 and 248 of said oscillatory arm 243, which will then yield under pressure of the spring 249 and carry the cross-head or sweep 244 away from the front open end of the galley 245, so as to permit the elevator 226 to lift the completely-justified line of type to required position in front of the galley. The elevator 226 will dwell for an instant at this point, due to the snapping of the spring-pin 231, Fig. 23, into the lower notch 230, and then as the roller 242 descends in bearing contact with the inclines 248 247, and thence onto the main portion of the oscillatory arm 243, the said arm will be thereby swung rearward, so that the attached cross-head 244 will sweep the justified type-line from the top of the elevator and into the galley. As each type-line is thus pushed into the rearwardly-inclined galley 245 the preceding type-lines will recede, together with a suitably-weighted slide-block 255, Figs. 24 and 25, that is placed across the rear of the first type-line to assist in supporting the column of accumulating justified type-lines. After each type-line is transferred by the sweep 244 from the elevator and into the galley 245 the elevator will descend, together with the link 236 and block 234, by reason of the pins 233, Fig. 23, becoming engaged with the lower ends of the slots 232, whereupon the spring-pin 231 will readily yield. Meanwhile the lever 237, Fig. 1, will be restored by its spring 239 and the slide-block 167, line-pusher 169, and vibrator 172 and their adjuncts will have resumed their functions of assembling another line of type in readiness for transfer to the justifier. It will be understood that when the type-line elevator 226 has completed its ascent and descent the clutch-disk 211, Figs. 2 and 3, will have made one revolution, whereupon the spring 220, Fig. 3, acting on the clutch-lever 219, will cause the attached bolt-rod 217 to snap into engagement with the beveled notch 218 of the spring-latch 214, Figs. 34 and 36, thus withdrawing said latch from its engagement with the rotary band-wheel 193, so that the latter will revolve loosely on its shaft 209, which will thus remain at rest until the operator again lifts the clutch-lever 219 to transfer another type-line into the justifier and there repeat the operations already described.

It will be readily perceived that the construction, arrangement, and mode of operation of the devices and mechanisms comprised in this improved type casting, composing, and justifying machine are such as to render the machine capable of meeting in a peculiar and very satisfactory manner the various conditions and requirements of modern printing, such as newspaper and other work, where speed, accuracy, and neat typographical appearance are demanded.

What we claim as our invention is—

1. The combination of a type-casting mold having a plurality of mold-cavities classified in groups according to the frequency with which certain type are required, means for introducing molten metal into said mold-cavities, mechanism for automatically controlling the frequency with which the type are cast in different groups of said mold-cavities, means for ejecting the cast type from the mold-cavities, a magazine provided with cells in which the type are accumulated from the mold, and type-setting mechanism in operative connection with said magazine-cells, substantially as described.

2. The combination of a type-casting mold having a plurality of mold-cavities classified in groups according to the frequency with which different type characters are required, a plurality of matrices adapted to coincide with said mold-cavities for simultaneously casting a set, group or groups of type bearing different characters, means for introducing molten metal into the mold-cavities, mechanism for ejecting type from the mold-cavities, a magazine provided with cells arranged to receive the type from the mold and in which the type are accumulated in assorted columns, and type-setting mechanism in operative connection with said magazine-cells, substantially as described.

3. The combination of a rotary mold having a plurality of mold-cavities classified in groups according to the frequency with which certain type are required, a plurality of matrices adapted to coincide with said mold-cavities and movable to and from the same for simultaneously casting a set or group of type bearing different characters, mechanism for rotating said mold intermittingly, means for introducing molten metal into the mold-cavities, mechanism for ejecting type from the mold-cavities, a magazine having a plurality of cells arranged to receive type from the mold and in which said type are accumulated in assorted columns, and type-setting mechanism in operative connection with said magazine-cells, substantially as described.

4. The combination of a type-casting mold having a plurality of mold-cavities classified in groups according to the frequency with which certain type characters are required, a plurality of matrices adapted to coincide with said mold-cavities for simultaneously casting a set, group or groups of type, means for introducing molten metal into a group or groups of said mold-cavities and molten soft metal into another group of said mold-cavities, for the casting of metal type and soft-metal spaces respectively, mechanism for ejecting the type and spaces from the mold-cavities, a magazine provided with a plurality of cells arranged to receive cast type and soft-metal spaces from said mold and in which said type and soft-metal spaces are accumulated in assorted columns, type-setting mechanism in operative connection with the magazine-cells, means for mechanically assembling the cast type and soft-metal spaces in a type-line, and justifier mechanism for justifying successive lines of type to a uniform length, substantially as described.

5. The combination of a type-casting mold having a plurality of mold-cavities classified in groups according to the frequency with which certain type characters are required and having also cavities for casting soft-metal spaces, a plurality of matrices adapted to coincide with the several cavities of said mold for simultaneously casting a set, group or groups of type and soft-metal spaces, means for introducing molten type-metal into a group or groups of said mold-cavities and molten soft metal into another group of said cavities, means for automatically controlling the frequency with which a group or groups of type are cast, mechanism for ejecting the cast type and soft-metal spaces from the respective mold-cavities, a magazine provided with cells in which the cast type and soft-metal spaces are accumulated in assorted columns, type-setting mechanism in operative connection with the magazine-cells, and justifier mechanism for justifying successive lines of type to bring the same to a uniform length by compression of the soft-metal spaces included in said type-lines, substantially as described.

6. The combination of an intermittingly-rotary mold having a plurality of cavities classified in groups according to the frequency with which certain type characters are required, a plurality of matrices adapted to coincide with said mold-cavities for casting a set, group or groups of type bearing different characters and a set of soft-metal spaces, ejectors for ejecting the cast type and soft-metal spaces from said mold-cavities, a magazine provided with a plurality of cells in which the metal type and soft-metal spaces are accumulated in assorted columns, type-setting mechanism in operative connection with the magazine-cells, and mechanism for justifying successive type-lines to a uniform length, substantially as described.

7. The combination of a type-casting mold having a plurality of mold-cavities for casting a set, group or groups of type, said mold-cavities being arranged in groups classified according to the frequency with which certain type are required, a plurality of matrices, a casting-pot movable to and from the mold and containing a number of separate reservoirs for molten metal, each of said reservoirs corresponding with a group of mold-cavities, plungers located in the several molten-metal reservoirs, means for automatically controlling the operation of one or more of said plungers to accord with the varying frequency required for the production of separate groups of type, ejectors for ejecting cast type from the mold-cavities, a magazine provided with a plurality of cells to receive the cast type in assorted columns, and type-setting mechanism in operative connection with said magazine-cells, substantially as described.

8. The combination of a type-casting mold having a plurality of cavities classified in groups according to the frequency required for the production of different type characters, a plurality of matrices, a casting-pot movable to and from the mold and having a number of separate reservoirs for molten type-metal and a reservoir for molten soft metal, plungers located in said reservoirs, mechanism for automatically controlling the operation of one or more plungers to accord with the frequency required for the production of different type, means for ejecting the cast type, a magazine having a plurality of type-cells to receive the cast type and soft-metal spaces from said mold and in which type-cells the type and spaces are assorted in columns, type-setting mechanism in operative connection with the magazine-cells, and justifier mechanism for bringing successive type-lines to a uniform length, substantially as described.

9. The combination of a type-casting mold having a plurality of mold-cavities arranged in groups corresponding with the frequency with which certain type characters are required, a plurality of matrices adapted to coincide with said mold-cavities for simultaneously casting a set, group or groups of type bearing different characters and also soft-metal spaces, means for introducing molten type-metal into some of the groups of mold-cavities and molten soft metal into another group of said cavities, means for ejecting type and soft-metal spaces from the mold-cavities, a magazine having a plurality of cells in which said type and soft-metal spaces from the mold are accumulated in assorted columns, type-setting mechanism in operative connection with said magazine-cells, mechanism for assembling type and spaces in line, and means for uniformly justifying successive type-lines, substantially as described.

10. The combination of a type-casting mold provided with a plurality of mold-cavities arranged in groups classified according to the frequency with which certain type characters are required, a plurality of matrices adapted to coincide with said mold-cavities for simultaneously casting a group of type bearing different characters, means for automatically controlling the introduction of molten type-metal into one or more groups of mold-cavities, mechanism for ejecting the cast type from the mold, a magazine provided with a plurality of cells to receive the type ejected from the mold and in which magazine-cells the type are accumulated in assorted columns, and type-setting mechanism in operative connection with said magazine-cells, substantially as described.

11. The combination of a type-casting mold provided with a plurality of mold-cavities, a plurality of matrices for simultaneously casting a set or group of type bearing different characters, mechanism for ejecting cast type from said mold-cavities, means for mechanically dressing the cast type as they are ejected from the mold-cavities, a magazine provided with a plurality of cells in which the cast type are accumulated in assorted columns, and type-setting mechanism in operative connection with said magazine-cells, substantially as described.

12. The combination of a type-casting mold provided with a plurality of mold-cavities arranged in groups classified according to the frequency with which certain type characters are required, a plurality of matrices adapted to coincide with said mold-cavities for simultaneously casting a group or set of type bearing different characters, means for automatically controlling the introduction of molten metal into the mold-cavities, ejectors for ejecting cast type from the several mold-cavities, mechanism for dressing the cast type as they are ejected from the mold-cavities, a magazine provided with a plurality of cells in which the cast type from the mold-cavities are accumulated in assorted columns, and type-setting mechanism in operative connection with said magazine-cells, substantially as described.

13. A type-casting mold provided with a plurality of mold-cavities, a plurality of matrices for simultaneously casting a set, group or groups of type bearing different characters, means for automatically moving said matrices toward and from the mold-cavities, ejectors for ejecting cast type from the mold-cavities, mechanism for dressing the cast type as they are ejected from the mold-cavities, a magazine provided with a plurality of cells in which the cast type from said mold are accumulated in assorted columns, and type-setting mechanism in operative connection with said magazine-cells, substantially as described.

14. The combination of a type-casting mold provided with a plurality of mold-cavities, a matrix-supporting bar movable toward and from said mold and provided with matrices adapted to coincide with the mold-cavities for simultaneously casting a set, group or groups of type bearing different characters, means for ejecting cast type from the mold-cavities, mechanism for automatically dressing the cast type as they are ejected from the mold-cavities, a magazine provided with a plurality of cells in which the cast type are accumulated in assorted columns, and type-setting mechanism in operative connection with said magazine-cells, substantially as described.

15. The combination of a type-casting mold provided with a plurality of mold-cavities, a plurality of matrices for simultaneously casting a group or set of type bearing different characters, said mold and matrices being movable toward and from each other, means for introducing molten metal into the mold-cavities, mechanism for ejecting cast type from the mold-cavities, and a trimmer provided with a plurality of cells or perforations having cutting edges at one end for automatically dressing the cast type as they are ejected from the mold-cavities, substantially as described.

16. The combination of a rotary type-casting mold provided with upper and lower sets of mold-cavities, a plurality of matrices movable toward and from a set of mold-cavities and adapted to coincide therewith for simultaneously casting a set or group of type bearing different characters, means for introducing molten metal into a set or group of mold-cavities, ejectors for ejecting cast type, mechanism for dressing said cast type as they are ejected from the mold, a magazine provided with a plurality of cells in which the cast type from the mold are automatically accumulated in assorted columns, a shiftable reversing and transfer bar having a plurality of passages for cast type, said reversing and transfer bar being located intermediate said dressing mechanism and magazine-cells, and type-setting mechanism in operative connection with the magazine-cells, substantially as described.

17. The combination of a type-casting mold provided with a plurality of mold-cavities, a pivotally-mounted matrix-carrying bar automatically movable toward and from said mold and having a plurality of matrices adapted to coincide with said mold-cavities for simultaneously casting a group or set of type bearing different characters, means for ejecting cast type from said mold-cavities, and trimmer mechanism for dressing cast type as they are ejected from the mold-cavities, substantially as described.

18. The combination of a type-casting mold provided with a plurality of mold-cavities, a plurality of matrices adapted to coincide with said mold-cavities for simultaneously casting a set or group of type bearing different characters, means for ejecting type from the mold-cavities, a magazine provided with a plurality of cells in which the cast type are accumulated in assorted columns, a shiftable transfer-bar intermediate said magazine and mold and provided with type-passages adapted to coincide alternately with said mold-cavities and magazine-cells, whereby through the movements of said bar the type contained in the passages thereof are reversed to bring the type characters thereon uppermost and to permit said type to enter the magazine-cells butt-end downward, springs for temporarily retaining type in the passages of said transfer-bar, and automatic releaser mechanism for controlling the operation of said springs, substantially as described.

19. The combination of type-casting mechanism comprising a plurality of mold-cavities, mechanism for ejecting cast type from said mold-cavities, a magazine having a plurality of cells in which the cast type ejected from the mold are accumulated in assorted columns, a shiftable reversing and transfer bar located intermediate the mold-cavities and magazine-cells and provided with type-passages adapted to coincide alternately with said mold-cavities and magazine-cells, springs located in the passages of the transfer-bar for temporarily retaining type therein and to prevent said type from dropping out except to enter the magazine-cells that are not quite filled, and releaser mechanism for automatically controlling said springs, substantially as described.

20. The combination of type-casting mechanism comprising a plurality of mold-cavities, mechanism for ejecting cast type from the mold-cavities, a magazine having a plurality of cells in which the cast type are to be accumulated in assorted columns, a shiftable transfer-bar intermediate said mold-cavities and magazine-cells and having a plurality of type-passages adapted to coincide alternately with the mold-cavities and magazine-cells, springs located in said type-passages of the transfer-bar and projecting therefrom at one end, the said springs being adapted to bear on the type in said passages to temporarily retain type therein, and releaser mechanism provided with bearings for the outer ends of said springs and adapted to control the operation of said springs for permitting the discharge of type into such magazine-cells as are not quite filled and to retain surplus type in the passages of the transfer-bar when the same is moved away from the magazine, substantially as described.

21. The combination of type-casting mechanism comprising a plurality of mold-cavities arranged in groups for the simultaneous casting of a set, group or groups of type bearing different characters and also soft-metal spaces, mechanism for automatically controlling the introduction of molten metal into the several groups of mold-cavities according to the frequency with which the casting of different kinds of type may be required, mechanism for ejecting cast type from said mold-cavities, a magazine provided with a plurality of cells to receive cast type from said mold-cavities and accumulate the said type in assorted columns, and type-setting mechanism in operative connection with said magazine-cells, substantially as described.

22. The combination of type-casting mechanism comprising a movable mold having separate sets of mold-cavities arranged in groups, a matrix-carrying bar, one or more, provided with matrices adapted to coincide with the mold-cavities, means for automatically controlling the introduction of molten metal into one or more groups of mold-cavities, mechanism for ejecting cast type from the mold, a magazine having a plurality of cells in which the type are accumulated in assorted columns, and type-setting mechanism in operative connection with said magazine-cells, substantially as described.

23. The combination of a rotary type-casting mold provided with a plurality of mold-cavities, a plurality of matrices automatically movable toward and from said mold-cavities, a casting-pot movable toward and from the mold for periodically introducing molten metal into the mold-cavities, mechanism for ejecting cast type from the mold, a trimmer for dressing the cast type as they are ejected from the mold, a magazine having a plurality of cells in which the cast type are accumulated in assorted columns, reversing and transfer mechanism intermediate said trimmer and the magazine, and type-setting mechanism in operative connection with the magazine-cells, substantially as described.

24. The combination of type-casting mechanism comprising a plurality of mold-cavities, a plurality of matrices movable toward and from said mold-cavities and adapted to coincide therewith, means for periodically introducing molten metal into the mold-cavities, ejector mechanism for removing cast type from the mold-cavities, a magazine provided with a plurality of cells in which the cast type from the mold are accumulated in assorted columns, a reversing and transfer bar intermediate the mold and the magazine and provided with a plurality of type-passages, springs arranged in said passages for temporarily retaining type therein, automatic releaser mechanism for said springs, and type-setting mechanism in operative connection with the magazine-cells, substantially as described.

25. The combination of type-casting mechanism comprising a plurality of mold-cavities arranged in groups, a plurality of matrices also arranged in groups and adapted to coincide with said mold-cavities, means for automatically controlling the introduction of molten metal into separate groups of mold-cavities, and mechanism for ejecting the cast type, substantially as described.

26. The combination of type-casting mechanism comprising a plurality of mold-cavities arranged in groups to accord with the varying frequency required for production of separately-classified groups of printing characters, a plurality of matrices corresponding with and adapted to coincide with said mold-cavities, means for automatically controlling the introduction of molten metal into separate groups of mold-cavities, mechanism for ejecting cast type from the mold-cavities, a magazine having a plurality of cells in which the cast type from the mold-cavities are accumulated in assorted columns, and type-setting mechanism in operative connection with said magazine-cells, substantially as described.

27. The combination of type-casting mechanism comprising a plurality of mold-cavities arranged in groups corresponding with the classification of printing characters according to the frequency with which certain characters are required, a plurality of corresponding matrices, some of the mold-cavities being adapted for the production of type bearing printing characters thereon and other mold-cavities being for the production of compressible spaces, mechanism for ejecting the cast type and compressible spaces from the respective mold-cavities, a magazine having a plurality of cells in which the cast type and spaces from the mold are accumulated in assorted columns, type-setting mechanism in operative connection with said magazine-cells, means for mechanically releasing type and spaces from said magazine-cells and assembling the same in line, and mechanism for justifying successive type-lines to a uniform length, substantially as described.

28. The combination of type-casting mechanism comprising a plurality of mold-cavities, a plurality of matrices, means for introducing type-metal into the mold-cavities, a knife or cutter for trimming the butt-ends of the cast type while they are in the mold-cavities, mechanism for ejecting cast type from the mold-cavities, and a trimmer for dressing the cast type as they are ejected from the mold-cavities, substantially as described.

29. The combination of a type-casting mold having a plurality of mold-cavities, a plurality of matrices, a casting-pot movable toward and from the mold-cavities, means for automatically controlling the flow of molten metal into separate mold-cavities, and mechanism for ejecting cast type from the mold-cavities, substantially as described.

30. The combination of a type-casting mold having a plurality of mold-cavities arranged in groups, a plurality of corresponding matrices, a casting-pot movable toward and from the mold-cavities and provided with a plurality of molten-metal reservoirs corresponding with separate groups or mold-cavities, plungers in the separate molten-metal reservoirs, lever mechanism through which said plungers are actuated, and automatically-controlled locking mechanism for one or more of the plunger-levers, substantially as described.

31. The combination of an intermittingly-rotary casting-mold provided with a plurality of mold-cavities, a plurality of matrices, means for automatically locking said mold when its mold-cavities coincide with said matrices, means for introducing molten metal into the mold-cavities, and reciprocating ejectors for ejecting cast type from the cavities, substantially as described.

32. The combination of an intermittingly-rotary type-casting mold provided with a plurality of mold-cavities, a plurality of matrices, means for introducing molten metal into the mold-cavities, a reciprocating ejector-head provided with a plurality of ejector-fingers for ejecting cast type from the mold-cavities, and stop devices carried by said reciprocating ejector-head for the purpose of engaging the intermittingly-rotary mold to hold the same stationary while one set of type is being cast and another set ejected, substantially as described.

33. The combination of type-casting mechanism comprising a casting-pot having a plurality of molten-metal reservoirs therein, some of said reservoirs being for molten type-metal and another for molten soft metal, an intermittingly-rotary mold provided with separate sets of mold-cavities arranged in groups, each group of mold-cavities being adapted to communicate with a separate molten-metal reservoir of the casting-pot, a plurality of matrices, mechanism for automatically controlling the introduction of molten metal into the separate groups of mold-cavities, ejectors for ejecting cast type and soft-metal spaces from the several groups of mold-cavities, a magazine having a plurality of cells in which the cast type and compressible spaces from the mold-cavities are accumulated in assorted columns, type-setting mechanism in operative connection with the magazine-cells, means for mechanically releasing type and spaces from the magazine-cells to assemble the same in line, and mechanism for justifying successive type-lines to a uniform length, substantially as described.

34. The combination with a type-casting mechanism, and a magazine comprising a plurality of cells in which the cast type from the casting mechanism are accumulated in assorted columns, of an endless traveling apron inclined forwardly and downwardly from a lower part of said magazine, type-setting mechanism in operative connection with the magazine-cells and adapted to release type therefrom to be delivered upon said endless apron, converging guides in close proximity with the working face of said traveling apron, a type-spout to receive type in succession from said apron, an automatically-acting stop arranged in said type-spout to temporarily arrest the movement of type through said spout, an assembling-box in which the type from said spout are assembled in line, justifying mechanism, and mechanism for assembling type in line within the assembling-box and for moving the same to the justifying mechanism, substantially as described.

35. The combination with type-casting and type-setting mechanism comprising a magazine having a plurality of cells in which the cast type are accumulated in assorted columns, an endless traveling apron on which the type are received when released from the magazine-cells, and converging guides in close proximity with the working face of said apron, of a type-spout located at the convergence of said guides to receive type successively from said apron, an automatic stop located in said spout to temporarily arrest the movement of successive type through the spout, an assembling-box to receive type from said spout and in which they are assembled in line, means for holding the type upright in the assembling-box, a vibrator for feeding the line of type while being assembled, and a pusher for transferring the assembled line of type to a justifying mechanism, substantially as described.

36. The combination with a type-casting mechanism and a connected type-setting mechanism, of an assembling-box provided with means for holding type upright therein while a line of type is being assembled, a type-spout through which type are separately delivered into said assembling-box, an automatic stop located in said spout for temporarily arresting the passage of type, a vibrator for feeding separate type into the line, and a pusher for pushing an assembled type-line from the assembling-box to a justifying mechanism, substantially as described.

37. The combination with type-casting and type-setting mechanisms, of a type-spout to receive type successively, an automatic type-stop located in said spout to temporarily arrest the passage of type through the same, an assembling-box having one end in communication with said type-spout, means for holding type upright in the assembling-box, a vibrator for feeding successive type into the type-line, and a reciprocating pusher by which said vibrator is carried and adapted to coact therewith for pushing an assembled line of type to a justifying mechanism, substantially as described.

38. The combination with a type-casting mechanism, and a type-setting mechanism adapted to assemble individual type in a line composed of metal type and compressible spaces, of justifying mechanism for first compressing a type-line to approximately the required length and finally justifying said line to a standard length, substantially as described.

39. The combination with type-casting mechanism for casting metal type and soft-metal compressible spaces, and a magazine provided with a plurality of cells in which said type and compressible spaces are accumulated in assorted columns, of type-setting mechanism in operative connection with said magazine-cells for releasing type and spaces from said cells and assembling the same in line, and justifying mechanism in operative connection with said type-setting mechanism for first compressing a type-line to approximately the required length and finally justifying the same to a standard length, substantially as described.

40. The combination of type-casting mechanism adapted for the production of metal type and soft-metal compressible spaces, type-setting mechanism for assembling individual type and spaces in a type-line, and justifying mechanism adapted for first compressing a type-line to approximately the required length and finally justifying it to a standard length, substantially as described.

In testimony whereof we have hereunto set our hands in presence of two subscribing witnesses.

JOSEPH C. FOWLER.
JOSEPH C. FOWLER, JR.

Witnesses:
JAMES L. NORRIS,
GEO. W. REA.